United States Patent
Kumar et al.

(10) Patent No.: US 11,853,321 B1
(45) Date of Patent: Dec. 26, 2023

(54) DATA REPLICATION WITHOUT IN-PLACE TOMBSTONES

(71) Applicant: Amazon Technologies, Inc., Seattle, WA (US)

(72) Inventors: Ranjeesh Kumar, Seattle, WA (US); Mohamed Emad El Din Fathalla, Carnation, WA (US); John Salomone, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 611 days.

(21) Appl. No.: 16/008,940

(22) Filed: Jun. 14, 2018

(51) Int. Cl.
  *G06F 16/27* (2019.01)
  *G06F 3/06* (2006.01)
  *G06F 16/2455* (2019.01)

(52) U.S. Cl.
  CPC ............ *G06F 16/273* (2019.01); *G06F 3/065* (2013.01); *G06F 16/24568* (2019.01); *G06F 2201/82* (2013.01)

(58) Field of Classification Search
  None
  See application file for complete search history.

(56) References Cited

U.S. PATENT DOCUMENTS

| | | | |
|---|---|---|---|
| 6,256,634 B1 | 7/2001 | Moshaiov et al. | |
| 6,810,423 B1* | 10/2004 | Gonno | G06F 16/958 707/E17.116 |
| 8,965,849 B1 | 2/2015 | Goo | |
| 9,043,640 B1* | 5/2015 | Havemose | G06F 11/1469 714/15 |
| 9,274,710 B1* | 3/2016 | Oikarinen | G06F 13/18 |
| 9,471,585 B1* | 10/2016 | Theimer | G06F 3/0641 |
| 9,817,703 B1* | 11/2017 | Ryland | G06F 9/52 |
| 9,904,721 B1* | 2/2018 | Holenstein | G06F 16/273 |
| 2002/0099728 A1* | 7/2002 | Lees | G06F 16/27 |
| 2003/0126133 A1* | 7/2003 | Dattatri | G06F 16/2358 |
| 2004/0148317 A1* | 7/2004 | Sundararajan | G06F 16/275 |
| 2005/0021567 A1* | 1/2005 | Holenstein | G06F 16/273 |
| 2007/0282914 A1* | 12/2007 | Sivapragasam | G06F 16/273 |
| 2008/0052322 A1 | 2/2008 | Gusciora | |
| 2010/0121817 A1 | 5/2010 | Meyer et al. | |

(Continued)

*Primary Examiner* — Neveen Abel Jalil
*Assistant Examiner* — John J Morris
(74) *Attorney, Agent, or Firm* — Robert C. Kowert; Kowert, Hood, Munyon, Rankin & Goetzel, P.C.

(57) ABSTRACT

Systems and methods are disclosed to perform data replication based on an update stream from a source data store and over a communication channel that does not guarantee a correct ordering of stream events at the destination data store. In embodiments, an event sender receives the update stream and marks each event with a clock value according to the correct order. The marked events are then sent via the communication channel. In embodiments, an event replicator fetches the events from the communication channel and applies them to the destination data store. Older or duplicate events may be detected using the clock values and appropriately ignored. A tombstone object is maintained separately from the destination object to track deleted data items in order to avoid in-place tombstoning. Conditional updates and delete barriers are used to ensure that the objects are updated correctly by concurrently executing replicator nodes.

24 Claims, 19 Drawing Sheets

(56) References Cited

U.S. PATENT DOCUMENTS

| | | |
|---|---|---|
| 2010/0153953 A1 | 6/2010 | Adl-Tabatabai et al. |
| 2017/0093755 A1* | 3/2017 | Pol .......................... G06F 9/505 |
| 2019/0155937 A1* | 5/2019 | Barve ..................... G06F 16/27 |
| 2019/0294582 A1* | 9/2019 | Zhu ...................... G06F 15/167 |

* cited by examiner

DATA REPLICATION WITHOUT IN-PLACE TOMBSTONES

BACKGROUND

Many companies operate large data centers to provide the resources to handle customer's needs. Recently, a "cloud" computing model has enabled companies to lease computing resources on an as-needed basis from providers. In such models, computing resources are delivered as a service over a network such as the Internet. Instead of the company maintaining the data center at a facility owned by the company, the company can lease use of a virtual data center provided by a third-party provider.

One aspect of cloud services is cloud storage, where the service provider leases virtual storage space to various companies or individuals. For example, some cloud storage services allow users to store structured data in data centers around the world via a web interface. In some cloud storage services, it is useful to replicate data store data across different regions. For example, in some situations, it may be desirable to configure one data store in one region for a global author, and additional replicated data stores in other regions to facilitate local access. However, existing replication solutions within the data storage service are often lacking for a variety of reasons. For example, some replication solutions require a transmission protocol that guarantees the logical ordering of update events being replicated. Such ordering restrictions causes delay in the data replication process and may not be necessary in certain use cases where the replicated data need only be eventually consistent. Unfortunately, users generally have little or no control over the behavior of such canned replication solutions. Moreover, such replication solutions are typically tightly coupled to a specific storage system and are not easily adaptable to different types of data stores. Accordingly, there is a general need for improved data replication solutions that are more flexible and usable under different types of usage requirements.

Figure 1A:
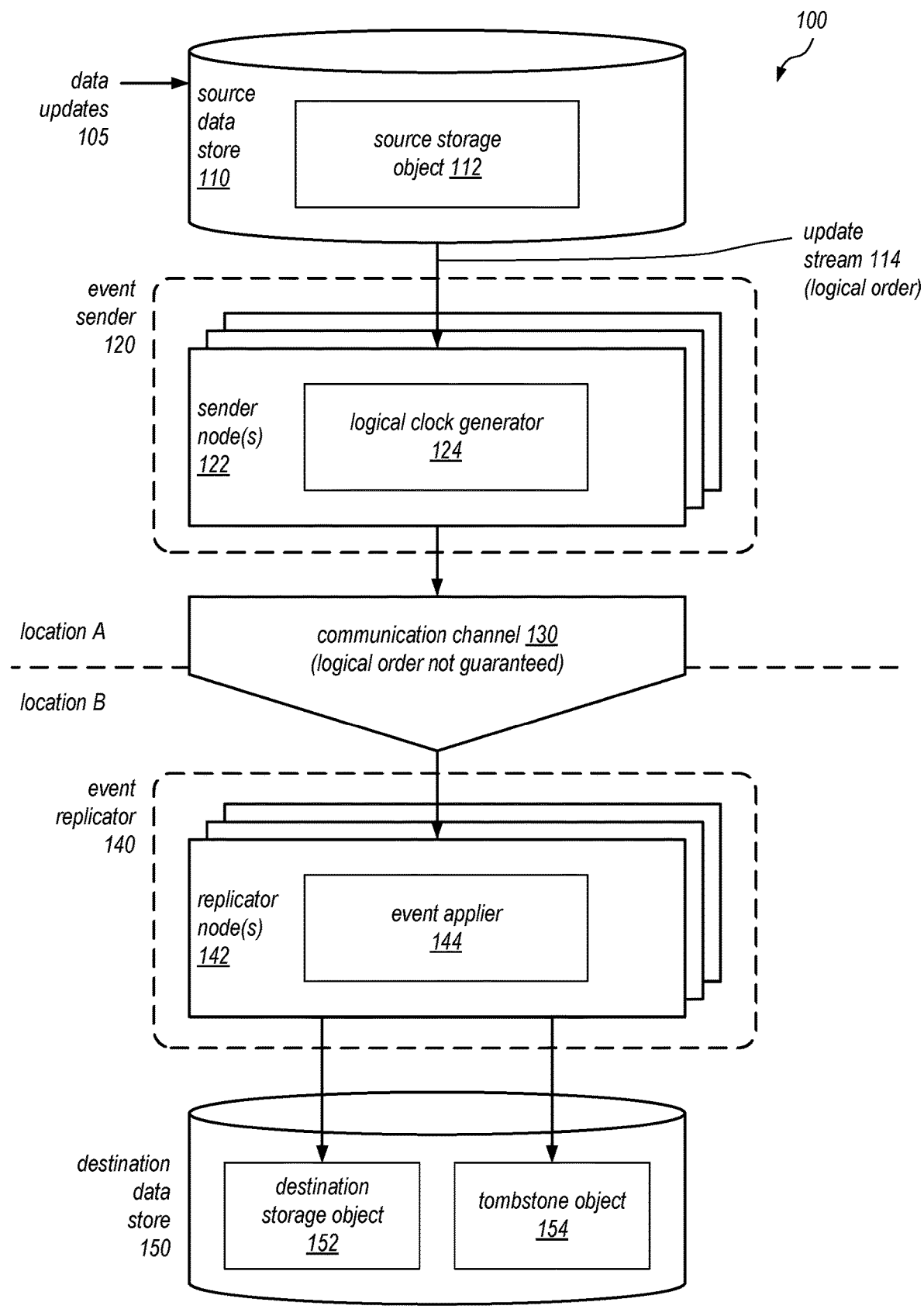
FIG. 1A is a block diagram illustrating an example data replication system that transmits update events over a communication medium that does not guarantee the logical ordering of transmitted events, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms.

These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a data replication system that transmits update events over a communication medium that does not guarantee the logical ordering of transmitted events. Combinations of the components and techniques described herein improve the functioning of existing data replication systems.

In embodiments, the data replication system employs an event sender at the source data store location and an event replicator at the destination data store location. The event sender may receive an update stream from the source data store that is ordered according to a logical order. The event sender may write a logical clock value on each update event according to the logical order, and then place the events on a communication channel to be transmitted to the destination location. Notably, the communication channel may be a communication medium that does not guarantee that the update events will arrive at the destination location in the logical order. In embodiments, an event replicator at the destination data store location may fetch update events from the communication channel, which may be out-of-order. The event replicator may then compare the logical clock values on the update events with corresponding logical values of the data items in the destination data store. In some embodiments, if the update event has an older logical clock value or version than the existing logical value or version of the data item in the destination data store, that update event may not be applied. In this manner, the data replication process may be implemented over a communication channel that does not preserve the order of the update events. However, such a data replication system still ensures that the replicated data is eventually consistent with the source data.

In some embodiments, the event sender may be implemented using a plurality of nodes, which may work together to obtain update events from the communication channel and process the events from the update stream. In some embodiments, these sender nodes, which may be individual hosts, processes, or threads, may be able to update shared data objects in parallel. In some embodiments, to guard against inconsistencies that may arise from such concurrent access, the sender nodes may employ a conditional update operation, wherein an update is performed only if a precondition is satisfied at the time of the update. If the precondition is not satisfied, the conditional update will not take effect.

In some embodiments, the data replication system may support update events that delete data items. In some embodiments, in order to apply a delete event, the subject data item may be deleted from a destination object in the destination data source. Furthermore, an indication of the delete operation may be tracked in a tombstone object that is distinct from the destination object. Accordingly, if an out-of-order update to that item later arrives at the destination data store, the event replicator can recognize that the later update is directed to an already-deleted data item, and then appropriately ignore the later update. By keeping the tombstoning outside of the destination object, users of the destination object are relieved from any knowledge the tombstoning. For example, in some embodiments, queries to the destination object do not have to filter for data items that have not been deleted. Thus, the separate tombstone object provides a degree of transparency to the users of the replicated data store.

In some embodiments, the event replicator may be implemented using a plurality of nodes, which may work together to obtain update events from the communication channel and apply the events to the destination data store. In some embodiments, these replicator nodes, which may be individual hosts, processes, or threads, may be able to update the destination data store (e.g., the destination object and the tombstone object) in parallel. In some embodiments, to guard against inconsistencies that may arise from such concurrent access, the event replicator nodes may employ a conditional update operation, wherein an update is performed only if a precondition is satisfied at the time of the update. If the precondition is not satisfied, the conditional update will not take effect. For example, in some embodiments, a data item may be inserted to one object only if a corresponding entry for the data item exists in another object.

In some embodiments, to further ensure correctness during concurrent access, the event replicator nodes may employ a delete barrier. In some embodiments, the delete barrier may be created by adding an indicator for the barrier to a data location (e.g., the tombstone object), which must be checked when applying delete events. In some embodiments, if a delete barrier is in effect, a replicator node attempting to apply a delete operation must wait until the delete barrier is removed. Thus, for example, a replicator node may erect a delete barrier before or when it is performing a series of critical update operations that cannot be disturbed by a delete operation. The replicator node may remove the delete barrier after the critical update operations are completed, so that any waiting delete events can be applied.

In some embodiments, a replicator node that created or owns a delete barrier may fail to properly remove the delete barrier, even though it is no longer used. For example, in some embodiments, the creator or owner node may crash or cease to function properly while it is applying the critical updates. As a result, the creator or owner node may not be able to remove the delete barrier that it created. In some embodiments, a later replicator node attempting to apply a delete event may perform a series of checks to determine if an existing delete barrier is still valid. If not, the later replicator node may simply remove the delete barrier by itself and proceed with the delete operation. In some embodiments, the validity check may involve checking heartbeat data of the creator or owner node. In some embodiments, if the creator or owner node has not provided an expected heartbeat recently, the checking node may determine that the creator node has stopped functioning as expected, and accordingly, remove the delete barrier. In some embodiments, the validity check may involve checking whether a process identifier of the creator node attached to the delete barrier matches a current process identifier of the creator node. If there is a mismatch, this may indicate that a process that originally created the delete barrier has been restarted. Based on this condition, the checking replicator node may remove the delete barrier on its own.

As may be understood, the data replication system as disclosed herein provides a number of technical benefits to existing data storage systems. For example, data replication enables automatic propagation of data to multiple locations. The maintenance of multiple replicas of data allows the data to be more accessible and highly available. For example, accesses may be performed more quickly on a local copy of replicated data, especially where the local copy is read-only. Moreover, date replication provides an archival function, so that the data can be restored in the event of data loss at one location.

Moreover, in some embodiments, the data replication system may be built from components that are external to or distinct from the data storage system itself. For example, the event sender and event replicator components may be implemented and deployed as a separate system or service that is distinct from the data store. By using external components, the actual user objects in source and destination data stores are not heavily impacted, making the replication process largely transparent to the users. For example, the event sender may be implemented completely outside of the source data store, so as to not impact the operations or performance of the source data store. In some embodiments, different types of event senders and event replicators may be implemented to adapt to different types of source and destination data stores, or different types of communication channels. In some embodiments, different destination data stores may implement different policies or data transformations during the replication process. Accordingly, the disclosed approach enables a high degree of flexibility and customizability in how the replication is performed.

In some embodiments, the data replication system may have to rely on a communication channel that cannot guarantee the correct ordering of the update events. For example, in some embodiments, the communication channel may be a public network that is prone to partial failures. In some embodiments, the communication channel may experience unexpected delays or perform delivery retries that are outside the control of the data replication system. However, by marking individual update events with logical clock values, the correct ordering of the events may be preserved and enforced at the destination data store. In some embodiments, the logical clock values may comprise vector clocks, which may include version numbers for a vector of different updaters of a data item. One vector clock value is newer than another vector clock value when all version numbers in the first vector clock are greater than corresponding vector numbers in the second vector clock, for example. By using vector clocks, the data replication system can track the progression of versions of a data item across multiple updaters.

By employing tombstoning, the data replication system is able to properly handle delete events. Specifically, when a data item is deleted from the destination data store, it is retained, possibly for a time period, so that its presence may be used to prevent out-of-order update events to that data item from being incorrectly applied. However, in some embodiments, it is undesirable to keep in-place tombstones that reside in the actual destination object. For example, keeping large amounts of already-deleted data in the destination object may increase the traffic and contention for the destination object in unexpected ways. As another example, users of the destination object may need to fashion queries in a way so as to filter out data items that have been tombstoned. To avoid such performance and usability problems, in some embodiments, the tombstones are maintained in a tombstone object that is separate from the destination object. In this manner, the tombstones may be fully transparent to the users of the destination object. In some embodiments, the event replicator may be implemented using multiple event sender or replicator nodes. This feature allows replication to be applied much more quickly, in a parallel fashion. For example, this is particularly useful in situations where a large volume of update events is occurring in the source data store, or multiple source data stores. In some embodiments, the event replicator may be shared by multiple data replication jobs and configured to capture update events from multiple source data stores. In some embodiments, the use of multiple nodes allows the event sender or event replicator to be automatically scaled in response to the volume of incoming events. As more events are seen, more nodes may be launched to handle the increased traffic. Moreover, failing nodes may be automatically replaced with new nodes. In some embodiments, because the replicator nodes may access common objects in the destination data store concurrently, measures may be taken to ensure correctness during concurrent access. In some embodiments, a conditional update operation may be used to prevent changing assumptions during a read-and-write operation. In some embodiments, to prevent the interleaving of inconsistent operations by multiple writers, a barrier may be implemented, so that certain critical sequences of operations are protected from interference by other writers. In some embodiments, a delete barrier may be used to prevent delete events on particular data items from being applied during certain operations. In some embodiments, the delete barrier is implemented in the tombstone object, which must be accessed to apply delete events. Accordingly, the delete barriers preserves the correctness of the event application logic in the context of concurrent application of update events. In some embodiments, the delete barriers may be employed so that consistency and correctness can be achieved during concurrent access, without using a transactional control mechanism provided or implemented by the destination data store itself. For example, some data stores may implement transactions where a group of database operations may be atomically performed, so that they will all take effect or fail as a group. However, such transactional control mechanisms are not always available for all desired types of destination data stores, and some implementations may be slow or inappropriate for other reasons.

In some embodiments, creators or owners of delete barriers may unexpectedly lose control of its delete barrier. For example, the creator node may experience a crash or another problem before it can remove the delete barrier. In some embodiments, the replication system may perform a garbage collection process to automatically remove such orphaned barriers. This feature thus ensures the smooth functioning of the system despite occasionally failing nodes and may be used to automatically remove orphaned barriers with no or little manual intervention. These and other features and benefits of the data store indexing system are described in further detail below, in connection with the figures.

FIG. 1A is a block diagram illustrating an example data replication system that transmits update events over a communication medium that does not guarantee the logical ordering of transmitted events, according to some embodiments. The figure depicts a data replication system 100.

As shown, the system 100 may be used to replicate data from a source storage object 112 in a source data store 110 to a destination storage object 152 in a destination data store 150. In some embodiments, the source data store 110 and destination data store may be located in different locations (locations A and B respectively). For example, location A may be a data center in one geographic location, and location B may be another a customer site at a second geographic location. In some embodiments, the two locations may be different physical locations. In some embodiments, the two locations may be different logical isolations (e.g., different availability zones or other logical grouping of resources). In some embodiments, the two locations may be a combination of different physical and logical isolations. The data stores 110 and 150 may be distinct from the rest of other components of the data replication system 100 shown in the figure. For example, the event sender 120 and event replicator 140 may be customized modules deployed to provide a customized data replication solution on top of the data stores. In some embodiments, the two data stores 110 and 150 may be different types of data stores.

In some embodiments, the source data store 110 may be configured to generate an update stream 114. In some embodiments, the update stream may contain individual update events that are received via data updates 105 to the data store. The updates may occur to data items within one or more storage objects, such as the source storage object 112. In some embodiments, the source storage object may be a table or other unit of data within the data store. In some embodiments, the update stream 114 may be provided as a public feature of the source data store 110. For example, in some embodiments, the update stream 114 may be generated to a stream database and interested users may register as listeners to stream. In some embodiments, as new update events occur within the source data store 110, all registered listeners are notified, in some cases asynchronously.

In some embodiments, the update stream may contain one update event for an update of a data item in the source data store. For example, every insert, update, or delete, etc. of an item in the data store generates an update event to the stream 114. In some embodiments, each event may contain the item key of the effected item. In some embodiments, the update event may contain the before and after state of the item due to the event. In some embodiments, the source data store may generate the update events in a logical order, which may be the same order that the events were applied to the source data store itself. In some embodiments, this logical ordering may be reflected in a sequence identifier for these events in the update stream 114.

As shown, in some embodiments, the data replication system 100 may include an event sender 120. In some embodiments, the event sender may be implemented using one or more computer systems. In some embodiments, the event sender 120 may register as a listener to the update stream 114. In some embodiments, the event sender 120 may be notified or obtained in the events in a different manner, for example, via periodic polling. In some embodiments, the event sender 120 may take the update events from the update stream 114, and send the events via a communication channel 130, as shown.

As shown, in some embodiments, the event sender 120 may be implemented using a plurality of sender nodes 122, which may execute independently to receive and process update events in the update stream 114. In some embodiments, each sender node 122 may be associated with a separate host, virtual machine instance, or a separate process, such as a Java virtual machine process. In some embodiments, these sender nodes 122 may execute in parallel or concurrently, so that the update stream 114 may be processed more quickly. In some embodiments, different sender nodes 122 may be used to process different update streams or different data sources. In some embodiments, the sender nodes 122 may be part of an auto-scaled group that automatically adjusts the size of the group based on the amount of traffic in the update stream 114. In some embodiments, failing nodes in the auto-scaled group may be automatically replaced with new nodes.

As shown, the communication channel 130 may span locations A and B, so as to enable the events from transmitted from location A to location B. In some embodiments, the communication channel 130 may comprise one or more networks, including possibly public networks, that may be used to transmit update events. In some embodiments, the communication channel 130 may not guarantee the logical order of the update events. For example, the communication channel 130 may receive the update events provided by the event sender 120 in one order but deliver the update events to the event replicator 140 in different order. In some embodiments, the change in ordering may be caused by partial failures in the communication network, or different paths taken by different events, or different latencies or retry attempts occurring at different parts of the communication network, among other reasons.

In some embodiments, the out-of-order delivery causes a problem for the event replicator 140, because in a data replication system, the update events must be applied in the correct order. Thus, to enable a correct ordering of the update events, the event sender 120 or individual sender nodes 122 may implement a logical clock generator 124, as shown, to write logical clock values to each of the update events before they are sent via the communication channel 130.

In some embodiments, the logical clock value may be generated based on the sequence identifier of the event in the update stream 114, which may be monotonically increasing. In some embodiments, the logical clock generator may reduce the sequence number to a version number for each individual data item, so that for each sequence of update events that impact that data item, those events are monotonically increasing in accordance with the logical order. For example, if a data item was updated three times in the update stream 114, the three update events may be written with versions 1, 2, and 3, respectively. When the events are so marked, the event replicator 140 may use these logical clock values to correctly apply the update events on the destination data store 150.

In some embodiments, the event sender 120 or sender nodes 122 may track current versions of all data items seen in the update stream 114, and increment the version number for each new update to a data item. In some embodiments, these versions may be tracked in a separate item version object or table. In some embodiments, with each update event, the generator 124 may read the current version of the item in question in the version object and generate a next version number from the current version, for example, by incrementing the current version by one. In some embodiments, the next version is then written back to the item version object and also marked on the outgoing update event.

In some embodiments, the logical clock generator 124 may also perform a function to detect duplicate update events. In some embodiments, each unique update event from the source data store may be associated with a unique event identifier. This event identifier may be used to detect whether a given event in the stream is a duplicate event. Such duplicate events may be created in some embodiments due to retries or a number of different reasons. In some embodiments, when a duplicate event is encountered, the generator 124 may not increment the version number for the item. In some embodiments, the duplicate event may be sent via the communication channel 130 using the current version number in the item version object.

As shown, the data replicator system may include an event replicator 140. In some embodiments, the event replicator may be implemented using one or more computer systems. In some embodiments, the event replicator 140 may be responsible for fetching the unordered update events from the communication channel 130 and applying those events to the destination data store 150 to reflect the replicated state of the data in the source data store.

The event replicator 140 may obtain the update events in a variety of ways. In some embodiments, the event replicator 140 may register as a listener to the communication channel 130 if the communication channel implements a listener call interface. In some embodiments, the communication channel 130 may buffer received update events, and the event replicator 140 may periodically poll the communication channel for newly received events. In some embodiments, the event replicator may download events from the communication channel in batches. In some embodiments, the event replicator may comprise a number of independent replicator nodes, which can each fetch or receive batches of update events and apply those events to the destination data store in parallel. In some embodiments, these nodes may be managed so that they can be automatically scaled to respond to the volume of incoming event traffic, and automatically heal in response to individually failing nodes.

In some embodiments, as shown, the event replicator 140 may be implemented via multiple replicator nodes 142. The replicator nodes may each independently operate to apply update events from the communication channel 130 to the destination data store 150. In some embodiments, the replicator nodes 142 may separately obtain update events from the communication channel. In some embodiments, the replicator nodes 142 may be assigned different update events via a managing node that retrieves the update events from the communication channel. In some embodiments, the replicator nodes may each be executing on a different physical host, or a different virtual machine instance. In some embodiments, each event replicator node may be associated with a separate process, such as a Java virtual machine process. In some embodiments, the replicator nodes 142 may be configured to update the objects in the destination data store at least partly in parallel.

In some embodiments, as shown, a replicator node 142 may implement an event applier 144 that applies the received update events to the destination data store 150. In some embodiments, the event applier 144 may implement a logical clock comparator. In some embodiments, the destination data store 150 may store, in addition to the replicated data, a last logical clock value or version number for each data item. In some embodiments, this last logical clock value may be stored as an additional attribute in the destination storage object 152. In some embodiments, this last logical clock value may be stored separately, for example in the tombstone object 154. In some embodiments, when a new update event is received by the event replicator 140, the logical clock comparator may check in the destination data store to obtain the last logical clock value of the data item being modified by the event. A comparison is made between the logical clock value in the destination data store 150 and the logical clock value for the event. If the event is newer (i.e., the logical clock value of the event is greater), the update event is applied to the destination data store. If the event is older, in some embodiments, the event replicator 140 may not apply the received update event and simply drop the update event. In this manner, update events are never applied out-of-order, even though they may be delivered out-of-order by the communication channel 130.

In some embodiments, the logical clock values may comprise a vector clock value. In some embodiments, a vector clock value may include a vector of version numbers, which correspond to different updaters of the data item. In some embodiments, one vector clock value is greater than another vector clock value if all versions in the first vector clock value are greater than all versions in the second vector clock value. In some embodiments, if some versions values are greater but others are less, this represents a branching in the versioning of the data item, and the event replicator may raise a warning indicating that there is a conflict in the versioning of the data item.

In some embodiments, as shown, the event applier 144 may implement a delete barrier manager. In some embodiments, because the replicator nodes 142 may update the objects in the destination data store 150 in parallel and concurrently, the replicator nodes 142 may implement a mechanism to exclude each other from concurrent access during a series of accesses that must occur without interference from other nodes. For example, in some embodiments, a simultaneous create item event and delete item event of the same item may lead to an incorrect state in the destination data store 150. To prevent such problems from occurring, in some embodiments, the replicator nodes will create and enforce delete barriers via the delete barrier manager.

In some embodiments, the delete barrier manager of one replicator node may create a delete barrier which indicates to other nodes to not apply delete events while the delete barrier is in effect. In some embodiments, the delete barrier may be created by setting one or more barrier attributes in a destination data store object, such as the tombstone object 154. In some embodiments, the replicator node may modify the destination data store while the delete barrier is in effect, and then remove the delete barrier after the modification is completed.

In some embodiments, when applying a delete event, a replicator node may check for a delete barrier for the affected data item using delete barrier manager. If a delete barrier is in place (e.g., a barrier attribute for that data item is set in the tombstone object), the deleting replicator node may wait until the delete barrier is removed before proceeding with the delete. In some embodiments, the deleting replicator node may perform a check to determine whether the creator node of the delete barrier is still using the delete barrier. A creator node may not be using the delete barrier if, for example, the creator node has crashed or was restarted. In these cases, the delete barrier is considered to be orphaned, and the deleting replicator node may simply remove the delete barrier (e.g., by unsetting the barrier attribute) and then proceed with the delete event.

As shown, in some embodiments, the destination data store 150 may be configured to include a tombstone object 154. In some embodiments, the tombstone object 154 may be stored in a separate data store as the destination data store 150. In some embodiments, the tombstone object 154 may be used to track deleted data items, so that their absence in the destination storage object 152 will not allow an out-of-order update of a deleted item to be erroneously applied. As discussed, by using a separate object or table to track deleted or tombstoned itemed, the destination storage object may be used by users without any awareness of the tombstoning mechanism. In particular, users of the destination object 152 are spared from having to write queries to filter out tombstoned items.

In some embodiments, the tombstone object 154 may only store the last state of the deleted items. In some embodiments, the tombstone object may also store data items that currently exist in the destination object. In some embodiments, the tombstone object may act as an event log, where all events impacting all data items are simply added to the tombstone object. In some embodiments, the tombstone object 154 may include additional metadata attributes for each entry, which may be used during the replication process. For example, in some embodiments, the tombstone object may store one or more barrier attributes that are in place for a particular data item. For example, all delete barriers associated with a particular data item may be seen from an entry corresponding to the last update event on that data item.

In some embodiments, the tombstone object 154 may be stored within the destination data store 150, as shown. In some embodiments, the tombstone object 154 may be stored in a separate repository that is accessible to the event replicator 140.

Figure 1B:
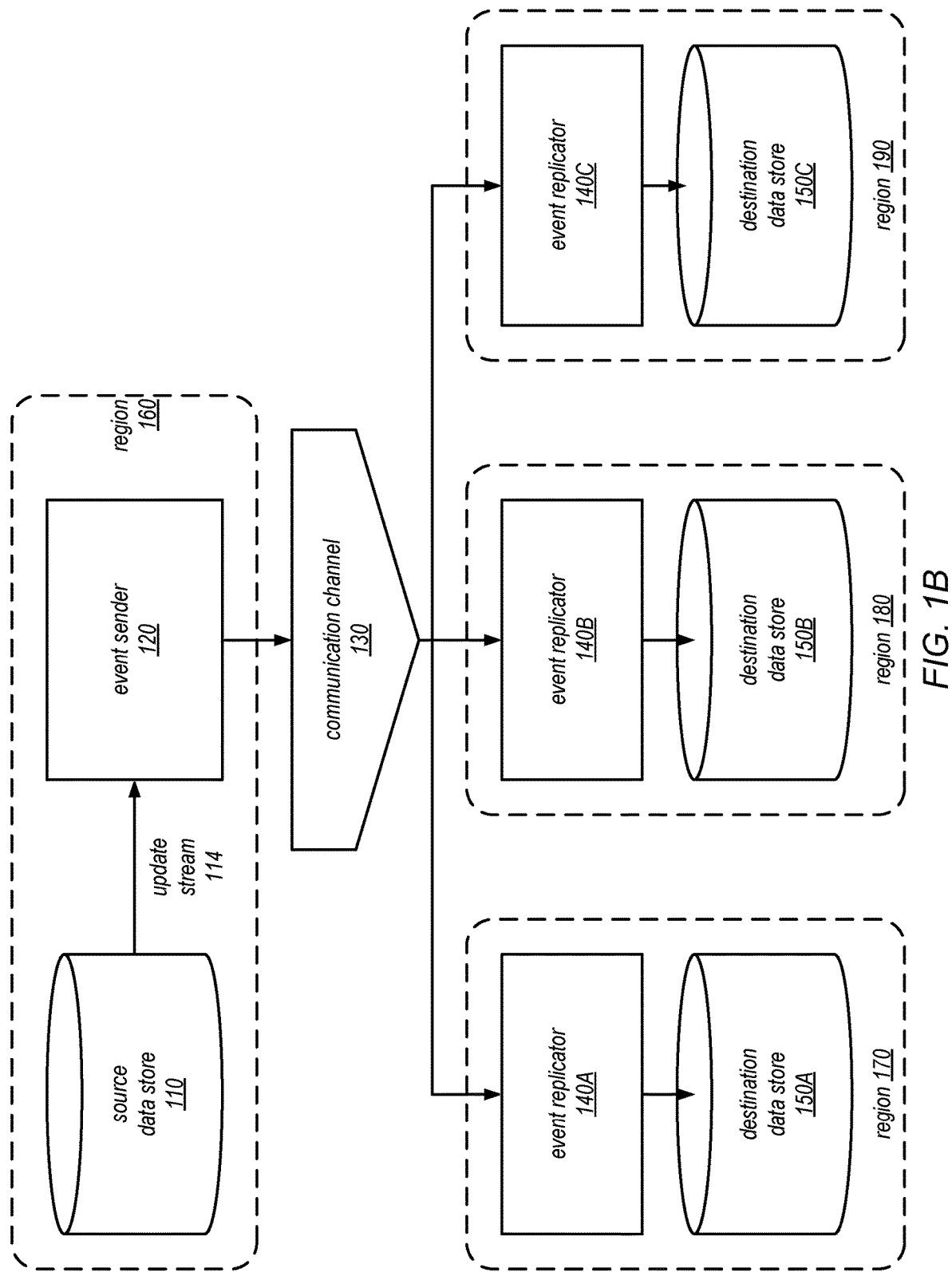
FIG. 1B is a block diagram illustrating an example data replication system that replicates update events to multiple remote destination data stores, according to some embodiments.

FIG. 1B is a block diagram illustrating an example data replication system that replicates update events to multiple remote destination data stores, according to some embodiments.

As shown, in some embodiments, the source data store 110 may act as a source of event updates for multiple destination data stores 150A-C by employing an event sender 120 that transmits update events over the communication channel 130. In some embodiments, the communication channel 130 may act as an event bus, where different event replicators may use to listen for updates events from the source data store. In some embodiments, as shown, each destination data store 150A-C may employ its own respective event replicator 140A-C, so that they may each implement data replication in different ways. For example, in some embodiments, two destination data stores may filter the update events differently. In some embodiments, two destination data stores may be data stores of different types. As may be understood, the data replication system is not tightly coupled to the data stores involved, so that it can be adapted for use with many different types of data stores.

In some embodiments, the source data store may be used as a master data store that propagates changes to a series of read-only data stores at remote locations. In this manner, users at different geographic locations may be provided an up-to-date view of the data in the source data store 110, which may allow the remote users to view the data more easily. In some embodiments, there may be multiple source data stores 110, so that update events can come from different sources. In some embodiments, a vector clock may be used to mark the update events that travel over the communication channel 130, so as to mark the events with a version number that reflects the versioning in each of the source data stores. In some embodiments, a single data store may be a source data store and a destination data store. For example, the single data store may employ both an event sender 120 and an event replicator 140.

Figure 2:
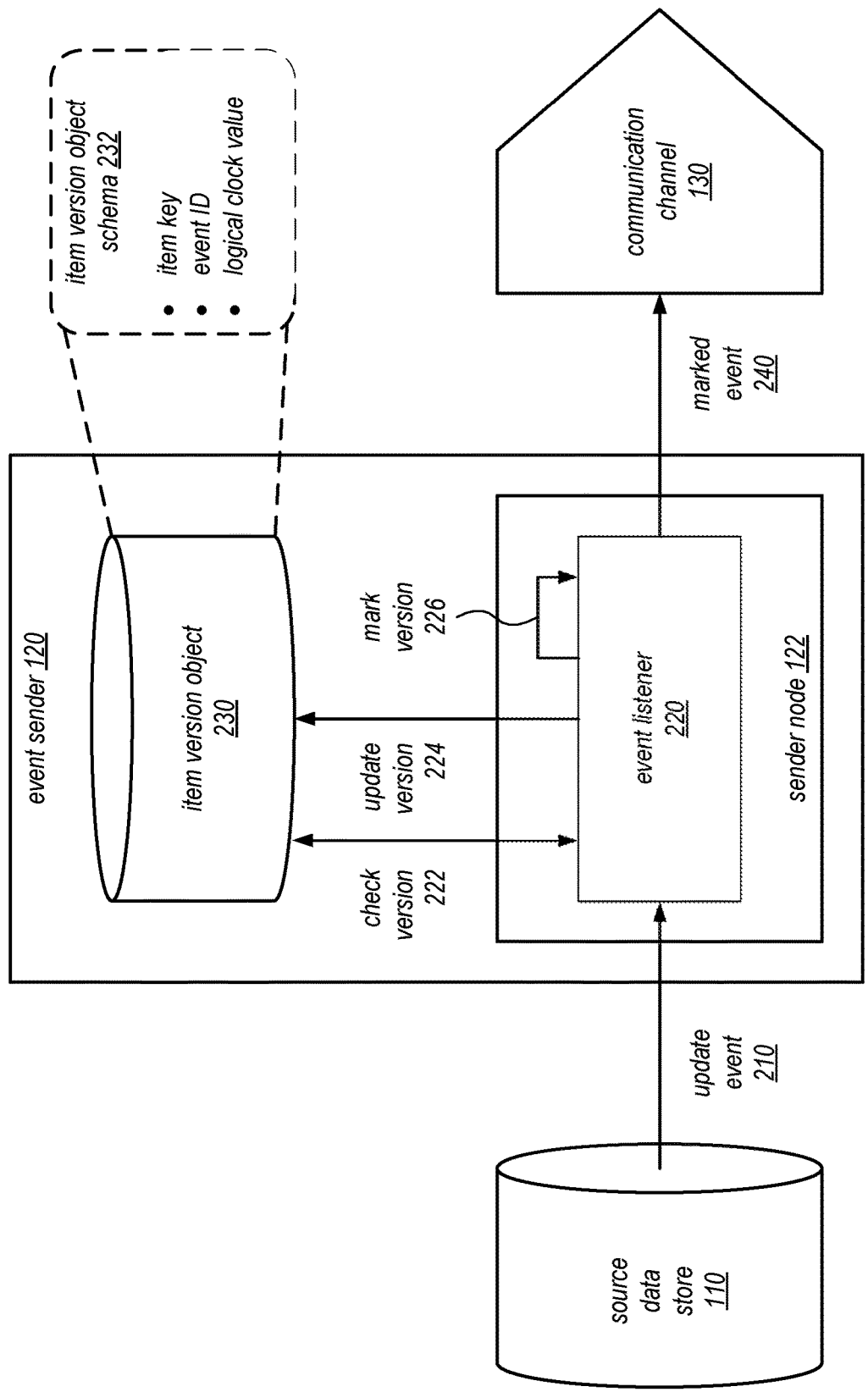
FIG. 2 is a block diagram illustrating an event sender used in a data replication system that transmits update events over a communication medium that does not guarantee the logical ordering of transmitted events, according to some embodiments.

FIG. 2 is a block diagram illustrating an event sender used in a data replication system that transmits update events over a communication medium that does not guarantee the logical ordering of transmitted events, according to some embodiments.

As shown, the event sender 120 or an individual event sender node may receive update events 210 from the source data store 110 and sends marked events 240 via the communication channel 130, as discussed in connection with FIG. 1A. As discussed in some embodiments, the update events 210 may be received via an update stream generated by the source data store. As shown, the event sender 120 or sender node 122 may implement an event listener 220, which listens for each update event, and then performs some processing on the update event when it is received. In some embodiments, the event listener 220 implements some of the functionality of the logical clock generator 124 as discussed in FIG. 1A.

As shown, in some embodiments, the sender node 122 may first check 222 the version of a data item that is the subject of the update event 210. As shown, the sender node 122 may maintain an item version object or table 230. In some embodiments, the item version object 230 may be stored in persistent store, such as a database. In some embodiments, the item version object 230 may be stored separately from the source data store 110. The schema for the object 232 is shown on the right. As shown, the item version object may include an item key (which may uniquely identify the item and include the primary key of the item), and event ID (which may be an identifier for the update event, which may be a hash of the stream sequence number), and a logical clock value (which may indicate the current or last version of the item). In some embodiments, the logical clock value may be a vector clock value, as discussed.

During the check operation 222, the event listener may attempt to look up the data item in question in the item version object 230. If the data item does not exist, a new entry for that data item may be created in the item version object 230, with an initial version number or logical clock value. If the data item already exists in the item version object, its current version number is obtained. The current version number is incremented to the next version number, for example, by adding one to the current version number. Then, in the update operation 224, the next version number is written back to the item version object 230 for that data item.

In some embodiments, because multiple different sender nodes may access the item version object 230 concurrently, the check operation 222 and the update operation 224 may be performed together in a single operation, so that no intervening write operations can occur on the item version object during the check 222 and the update 224. In some embodiments, the data store hosting the item version object 230 may support a conditional update, where an update is performed only if a precondition is simultaneously satisfied. In some embodiments, the check 222 and update 224 may be implemented using such a conditional update. For example, to increment a logical clock value or version number for an item to a next value, the condition update may be preconditioned to only succeed if the logical clock value equals a previous value. Thus, two sender nodes updating the clock value of the same data item cannot interleave their check 222 and update 224 operations, which may cause incorrect results. Finally, in the mark operation 226, the event is marked with the next version of the data item to produce the marked event 240. As may be understood, because the item version object 230 is persistently stored, in some embodiments, even if an event sender 120 were to crash or be restarted, the version marking activities can be resumed from the update stream 140.

In some embodiments, the event listener 220 may also perform a check for duplicate update events, which may occur as a result of retries or other reasons. For example, in some embodiments, the event listener may compare the event ID of the received event and the event ID in the item version object for the last seen version. If the two event IDs are the same, this implies a duplicate update event. In that case, the event listener 220 may not advance the version number. In some embodiments, the event listener 220 may mark the outgoing event with the current version number and forward the event to the communication channel 130.

Figure 3:
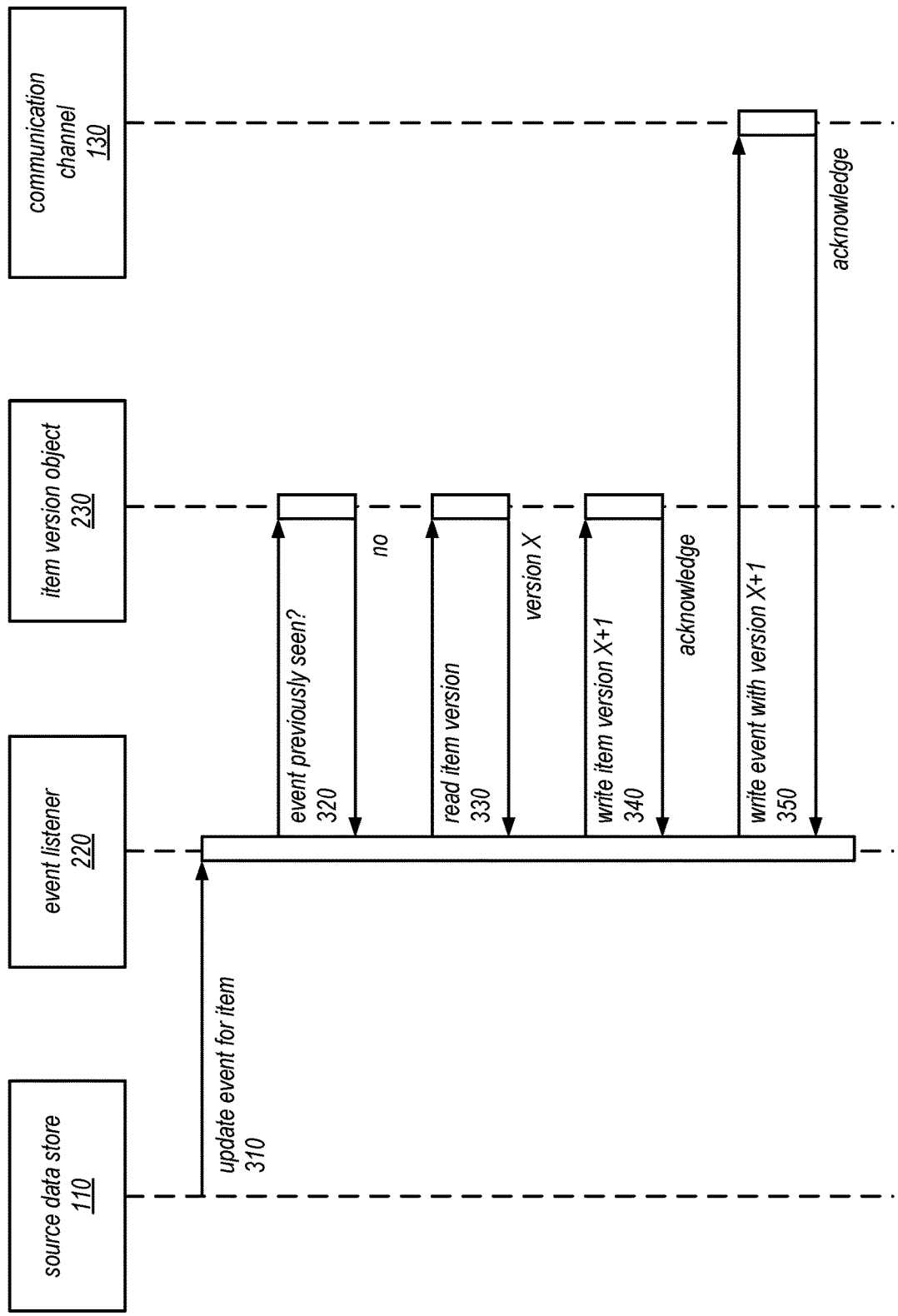
FIG. 3 is a system sequence diagram illustrating operations of an event listener used in a data replication system that transmits update events over a communication medium that does not guarantee the logical ordering of transmitted events, according to some embodiments.

FIG. 3 is a system sequence diagram illustrating operations of an event listener used in a data replication system that transmits update events over a communication medium that does not guarantee the logical ordering of transmitted events, according to some embodiments. As shown, the diagram depicts interactions between the source data store 110, event listener 220, item version object 230, and communication channel 130, as discussed previously.

At operation 310, an update event for an item is received at the event listener 220 from the source data store 110. As discussed, the event may be received as part of an update stream generated by the source data store 110.

At operation 320, a determination is made using the item version object 230 to determine whether the event has been previously seen. This determination may be made using, for example, the event ID on the incoming event. If so, this condition may indicate a duplicate event, which may cause the event listener to not advanced the item's version number.

At operation 330, the item version is read from the item version object. In some embodiments, operations 320 and 330 may be performed as a single query. As shown, the item version object indicates that the data item currently has version X.

At operation 330, the version number is incremented to version X+1 and written back to the item version object, which in turn acknowledges the write.

At operation 340, the event is marked with the version number X+1, and the event is written to the communication channel 130 to be transmitted to the destination location.

The following table illustrates one example algorithm for generating the logical clock value in the event listener 220:

TABLE 1

GIVEN:
    EVENT: Record read from update stream
    VERSIONS: Item version table that stores logical clock values for item
STEPS:
1. Obtain item_key and event_id from EVENT. item_key is a concatenation of the primary key values of the item and event_id is a hash of the stream sequence number.
2. Check if a logical clock value exists for item_key and event_id in VERSIONS.
   i. If it exists:
      a. Use the clock value to mark the EVENT and write to communication channel.
   ii. Else:
      a. Query VERSIONS to find the logical clock for item_key.
      b. If logical clock exists:
         1. Increment the logical clock by 1 and write it to VERSIONS conditionally. Condition used: item_key and event_id does not exist.
         2. Mark EVENT and write it to communication channel.
      c. Else:
         1. Initialize a new logical clock with value 1 and write to VERSIONS conditionally. Condition used: item_key and event_id does not exist.
         2. Mark EVENT and write it to communication channel.

As shown, in some embodiments, the event listener 220 may employ a conditional update operation to update the item version object 230. In some embodiments, the conditional operation may be associated with a precondition which is evaluated at the time that the update is performed by the operation. If the precondition evaluates to true, the update is performed. However, if the precondition evaluates to false, the update is not performed. The evaluation and the update are performed at the same time, so that no intervening changes in the precondition can occur after the evaluation and the update.

As shown, in some embodiments, the item version object 230 is updated only under the precondition that the same event (with the same event ID) is not present in the version object. An identical event ID would mean that there is a duplicate event in the version object. In that case, as discuss, the version number should not be incremented. In some embodiments, the item version 230 may be updated by multiple actors, for example, multiple nodes 122 of event senders 120. In such embodiments, to prevent two event sender nodes 122 from making inconsistent updates to the item version object, the updates to the object may be done using conditional update operations, as discussed.

Figure 4:
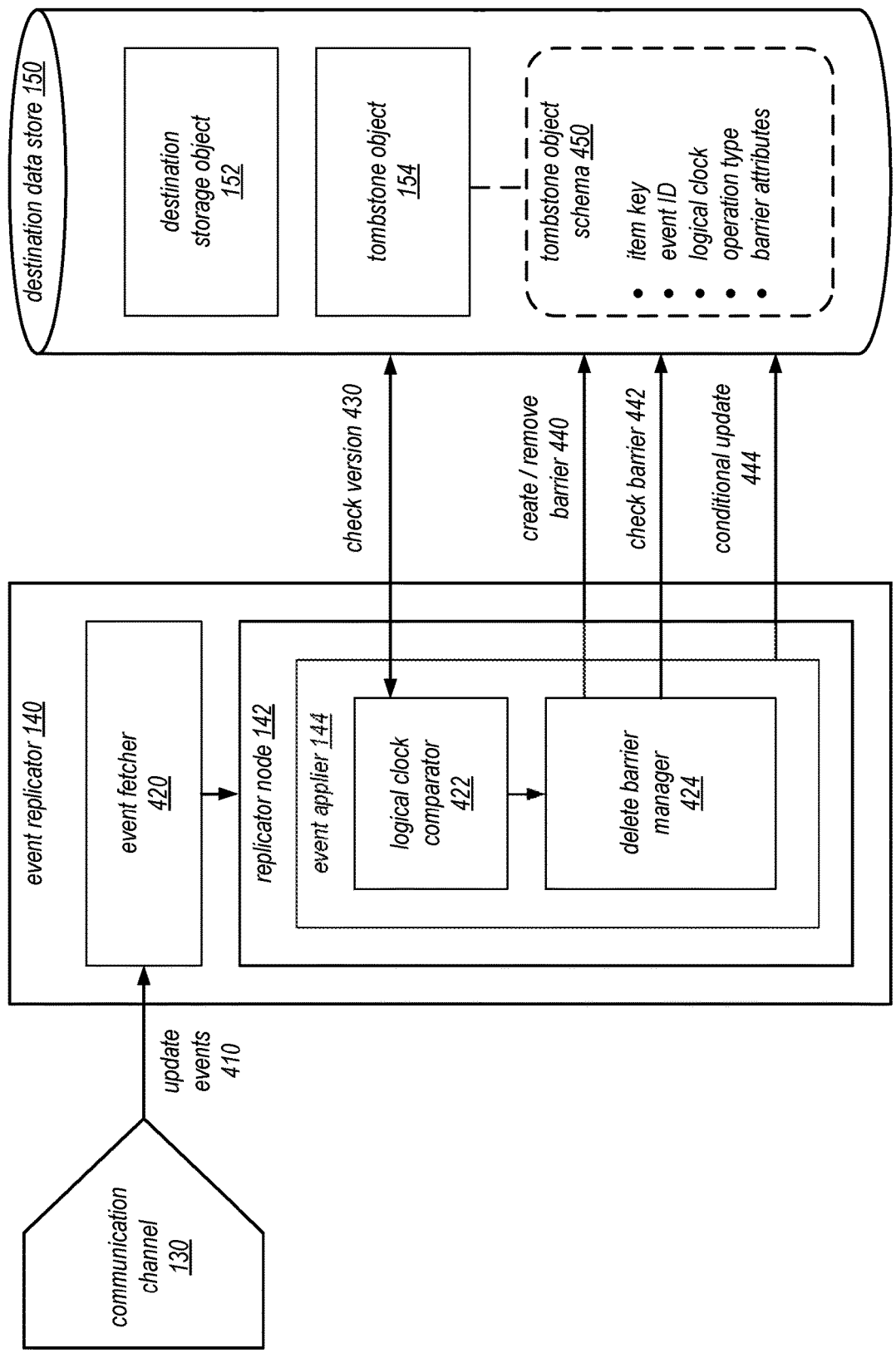
FIG. 4 is a block diagram illustrating an event replicator used in a data replication system that transmits update events over a communication medium that does not guarantee the logical ordering of transmitted events, according to some embodiments.

FIG. 4 is a block diagram illustrating an event replicator used in a data replication system that transmits update events over a communication medium that does not guarantee the logical ordering of transmitted events, according to some embodiments.

As shown, the event replicator 140 receives update events 410 from the communication channel 130 and applies the events to the destination data store 150, as discussed in connection with FIG. 1A. As discussed in some embodiments, the update events 410 may be fetched in batches, for example, via the event fetcher 420. In some embodiments, the event fetcher 420 may periodically poll the communication channel for newly received events and fetch the new events in batches to be applied to the destination data store. In some embodiments, as shown, the event replicator may comprise a plurality of replicator nodes 142 that independently and concurrently apply update events to the destination data store. In some embodiments, each node 142 may include its own event fetcher 420. In some embodiments, the event fetcher 420 may be a global component that assigns fetched events to individual replicator nodes 142.

As shown, in some embodiments, the replicator node 142 may implement an event applier that includes a logical clock comparator 422 and delete barrier manager 424. Depending on the embodiment, the replicator node 142 may be an individual host, virtual machine instance, process, or thread. In some embodiments, each replicator node 142 may be associated with a separate Java virtual machine process. In some embodiments, the components shown may be software components implemented by the replicator node 142.

In some embodiments, as shown, the replicator node 142 may perform a check operation 430 to check the version of the received updated event 410 with the version of the data item impacted by the event stored in the destination data store 150. As discussed, in some embodiments, the version may be a logical clock value or a vector clock value. In some embodiments, the destination data store may store last logical clock values or versions of individual data items in the destination storage object 152, so that they may be used to compared against incoming update events and possibly reject stale update events. In some embodiments, if the logical clock of the incoming update event is newer than the logical clock of data item in the destination storage object, the new event is applied. However, if the incoming update event is older, the update event may be ignored.

In some embodiments, as shown, the replicator node may perform a check barrier operation 442 to check, prior to applying a delete event, whether a delete barrier has been created for the affected data item. As discussed, in some embodiments, a delete barrier may be created to stop concurrently executing replicator nodes from applying delete events on a data item while the delete barrier is in effect for that item. In some embodiments, the delete barrier mechanism is used to prevent certain inconsistent states in the destination data store from occurring as a result of concurrent updates to the data store. If a delete barrier is detected, in some embodiments, the replicator node 142 may not apply a delete event until the delete barrier is removed. In some embodiments, the delete barrier is created by setting one or more barrier attributes in the tombstone object 154. In some embodiments, a deleting replicator node may periodically poll the tombstone object 154 to determine if a delete barrier has been removed.

In some embodiments, as shown, the replicator node may use the delete barrier manager 424 to create and remove 440 delete barriers. As discussed, in some embodiments, the delete barrier is needed to enforce a period of exclusive access for a data item, so that inconsistent state cannot occur in the destination data store. In some embodiments, the creation or remove operation 440 may modify the barrier attributes for the affected data item in the tombstone object 154. In some embodiments, the barrier attributes may accommodate a list of delete barriers, so that multiple barriers may be created for a single data item. In some embodiments, a delete replicator node may not proceed with a delete event until all delete barriers for an item have been cleared.

The application of the update event may be performed by the event applier 144, as shown. In some embodiments, the destination data store 150 may include a tombstone object or table 154, which may be distinct from the destination object 152. In some embodiments, the tombstone object may be used to track deleted or tombstoned data items, so that their logical clock values are preserved to prevent out-of-order updates to be applied to those deleted items. In some embodiments, the event applier 144 may update both the destination storage object 152 and the tombstone object 154 in applying update events.

An example schema 450 for the tombstone object is shown in the figure. In some embodiments, the tombstone object may contain the item key, the event ID, and the logical clock value of the item. In some embodiments, the tombstone object 154 may include an operation type attribute, which may specify whether an update event is a create, modify, or delete operation, etc. Thus, in some embodiments, the tombstone object may store more than just delete events. Furthermore, as shown, in some embodiments, the tombstone object may include a metadata attribute for delete barriers. For example, in some embodiments, a delete barrier may be raised with a particular type of event (for example, a new item creation). When that new item event is applied, a delete barrier flag may be set on that event record in the tombstone object. Later delete event appliers will check the tombstone table to discover that the last event to that data item created a delete barrier on that item, and accordingly, block until the barrier is lifted before proceeding. In some embodiments, the delete barrier may be a complex data structure or a reference to another object, which allows each event to be associated with a list or group of multiple delete barriers.

As shown, in some embodiments, the application of an update event may use a conditional update operation 444. For example, the conditional updates may ensure that certain read-and-write type operations are performed at the same time. However, in some cases, the conditional update alone is not sufficient to guarantee correctness in all situations. For example, in some embodiments, a first node may create a new item under the assumption that the new item is not in the replicated data store, while a second node concurrently creates and then deletes the same item in the destination data store. In this situation a precondition on the first creation operation that the new item does not exist will evaluate to true, so that the first creation will be performed. However, this is an incorrect result because in actuality the data item has been created and then deleted by the second node.

To guard against this and other types of concurrency problems, the event replicator 140 may implement a stronger form of concurrency control using a delete barrier. For the above case, any nodes that are initiating an item creation operation may erect a delete barrier. During the pendency of the delete barrier, no other concurrent node can apply a delete event to the data item in question. Thus, the second node in the above example cannot proceed with the delete operation, only the create operation. The first node, in turn, will eventually discover that the second node has already created the data item, and that its creation attempt should be aborted.

Accordingly, as shown, in some embodiments, the application of an update event (such as an item creation event) may be preceded by or occur with the creation of a delete barrier. In some embodiments, the delete barrier may be created with an update to the tombstone object 154, which may contain the delete barrier metadata. In some embodiments, to apply the update event, the tombstone object is modified first. After the delete barrier is created, the event applier 144 may then perform the necessary updates 444 to complete applying the update event. When the update event has been fully applied, the event applier 144 may then remove the delete barrier, so that any pending delete events may proceed.

Figure 5:
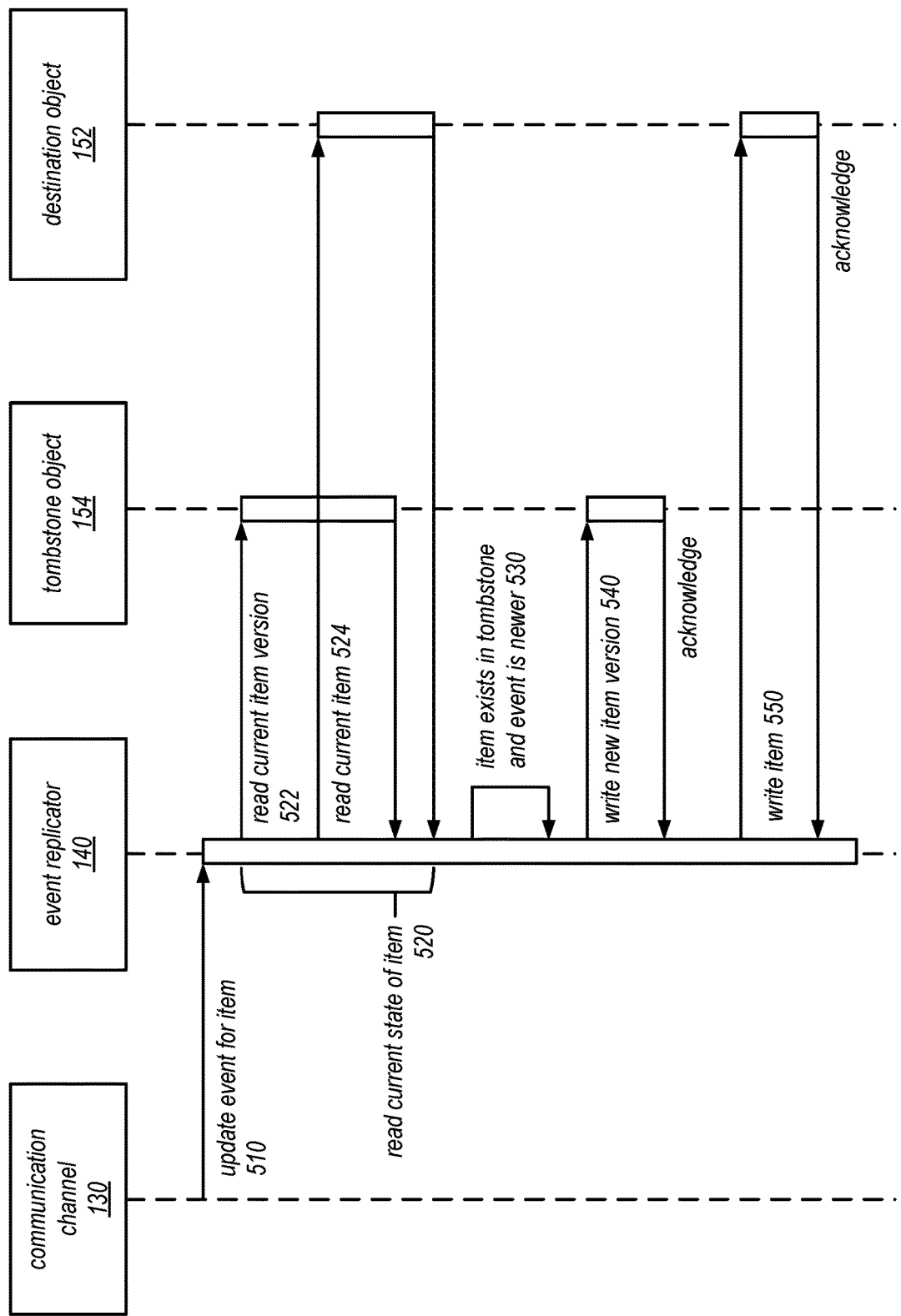
FIG. 5 is a system sequence diagram illustrating operations of an event replicator to apply an update event of an existing data item, according to some embodiments.

FIG. 5 is a system sequence diagram illustrating operations of an event replicator to apply an update event of an existing data item, according to some embodiments. As shown, the diagram depicts interactions between the communication channel 130, the event replicator 140, the tombstone object 154, and the destination object 152, as discussed previously.

At operation 510, an update event for an item is received from the communication channel. As discussed, the update event may be fetched from the communication channel in a batch based on periodic polling of the communication channel by the event replicator.

Operations 522 and 524 may be grouped together under operation 520, which reads the current state of the item modified by the update event from the destination data store. At operation 522, the tombstone object is read to obtain the current version of the item as updated by the last update event to the item. At operation 524, the destination object is read to obtain the current state of the item in the destination data store.

At operation 530, an examination of the item's current state is performed. In this example, the item exists in the tombstone object and the update event is newer (e.g., has a greater logical clock value or version). This means that this data item has seen previous update events in the destination data store, as reflected in the tombstone object. Moreover, the new update event should be applied because it is newer than the last known version in the destination data store. This comparison may be performed by for example the logical clock comparator 144, as discussed previously.

Accordingly, at operations 540 and 550, the update event is applied to the destination data store. At operation 540, the tombstone object is written to reflect the new version of the item. At operation 550, the destination object is written to reflect the new current state of the item. Both objects acknowledge accordingly.

Figure 6:
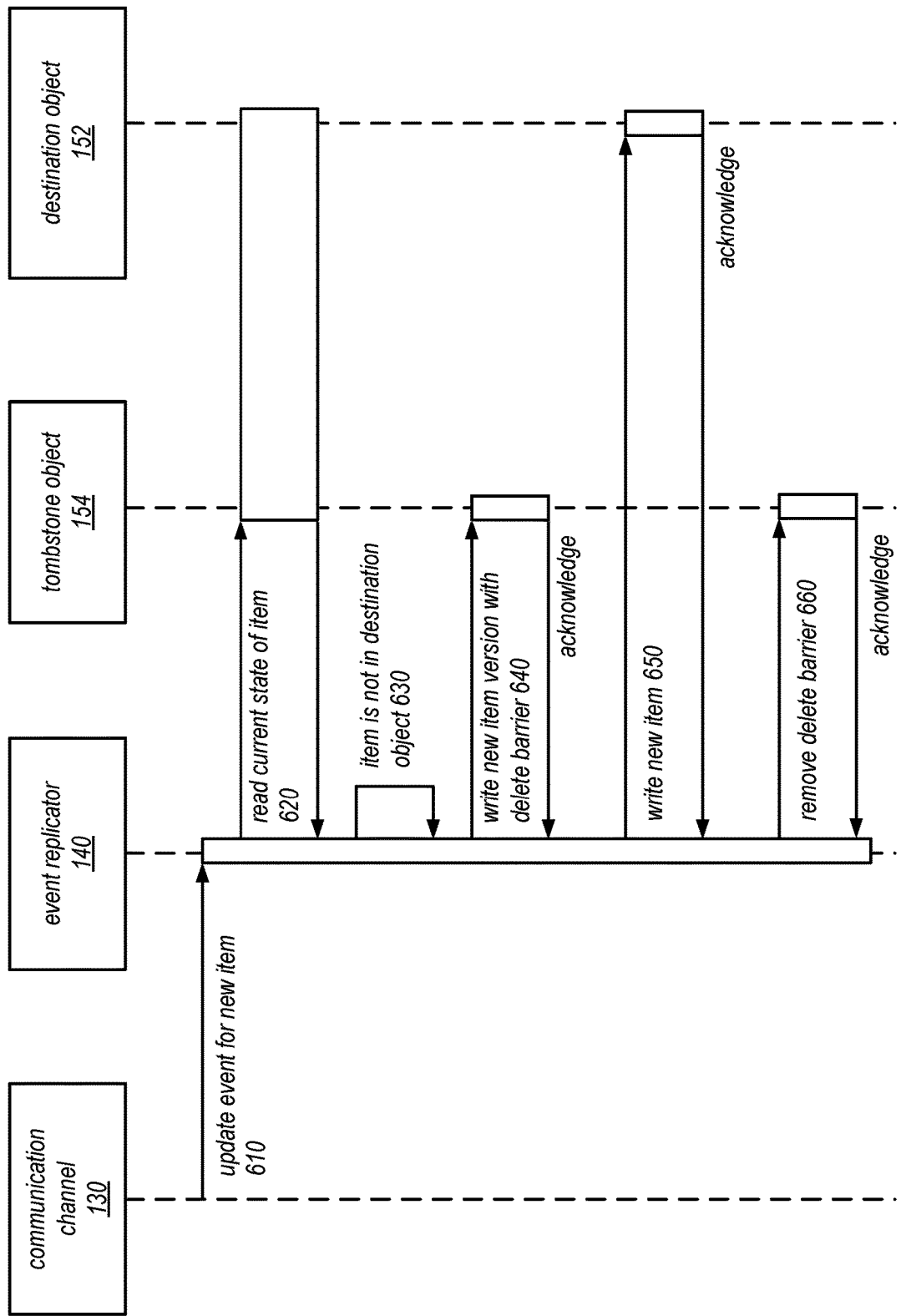
FIG. 6 is a system sequence diagram illustrating operations of an event replicator to apply a new data item event, according to some embodiments.

FIG. 6 is a system sequence diagram illustrating operations of an event replicator to apply a new data item event, according to some embodiments. As shown, the diagram depicts interactions between the communication channel 130, the event replicator 140, the tombstone object 154, and the destination object 152, as in the previous figure. However, this figure depicts an event that creates an item that does not current exist in the destination object 152.

At operation 610, the event for the item is received in similar fashion as discussed previously. At operation 620, the current state of the item in the destination data store is read, in similar fashion as discussed previously.

At operation 630, current state of the item is examined to determine that the item is not in the destination object. Thus, from the perspective of the destination data store, the data item is a new data item, or possibly a previously deleted data item. In either case, the new item event should be applied to the destination data store.

At operation 640, the new item version is written to the tombstone object 154 with a delete barrier. As discussed, in some embodiments, the delete barrier is used to apply certain update events (e.g., new item events) to prevent other replicator nodes from applying delete events on the same item. Use of the delete barrier prevents particular inconsistency problems during concurrent access of the destination data store by the different replicator nodes. In some embodiments, the delete barrier is created with the write to the tombstone object. The write may simultaneously add the new item version to the tombstone object and also erect the delete barrier.

At operation 650, the new item is written to the destination object 152. Note that this operation is performed while the delete barrier is in effect, so that no other replicator nodes can apply a delete event during this period.

At operation 660, the application of the new item event is completed, and the delete barrier is removed. At that point, any pending delete events that were block may now proceed.

The following table illustrates one example algorithm for applying item creation or update events, which may be performed by a replicator node 420:

TABLE 2

GIVEN:
    ITEM: Data item to be replicated
    * On all conditional failures, the replicator node has to start from STEP 1.
STEPS:
1. Read the record corresponding to ITEM from TOMBSTONE and DESTINATION tables. If ITEM is newer, proceed.
2. If the record does not exist in either table:
   i. Conditionally write ITEM to TOMBSTONE with a delete barrier. Condition used: record does not exist.
   ii. Conditionally write ITEM to DESTINATION. Condition used: record does not exist. On condition failure, remove the delete barrier.
   iii. Remove the delete barrier and stop.
3. If the record does not exist in DESTINATION but exists in TOMBSTONE:
   i. Compare the record version of ITEM with the item version from TOMBSTONE. Stop if ITEM is older than TOMBSTONE item.
   ii. Conditionally write ITEM to TOMBSTONE with a delete barrier. Condition used: TOMBSTONE item version has not changed.
   iii Conditionally write ITEM to DESTINATION. Condition used: record does not exist. On condition failure, remove the delete barrier.
   iv. Remove the delete barrier and stop.
4. If the record does not exist in TOMBSTONE but exists in DESTINATION:
   i. Conditionally write ITEM to TOMBSTONE. Condition used: record does not exist.
   ii. Conditionally write ITEM to DESTINATION. Condition used: DESTINATION item version has not changed.
5. If the record exists in both TOMBSTONE and DESTINATION:
   i. Compare the record version of ITEM with the item version from TOMBSTONE. Stop if ITEM is older than TOMBSTONE item.
   ii. Conditionally write ITEM to TOMBSTONE. Condition used: TOMBSTONE item version has not changed.
   iii. Conditionally write ITEM to DESTINATION. Condition used: DESTINATION item version has not changed.

Figure 7:
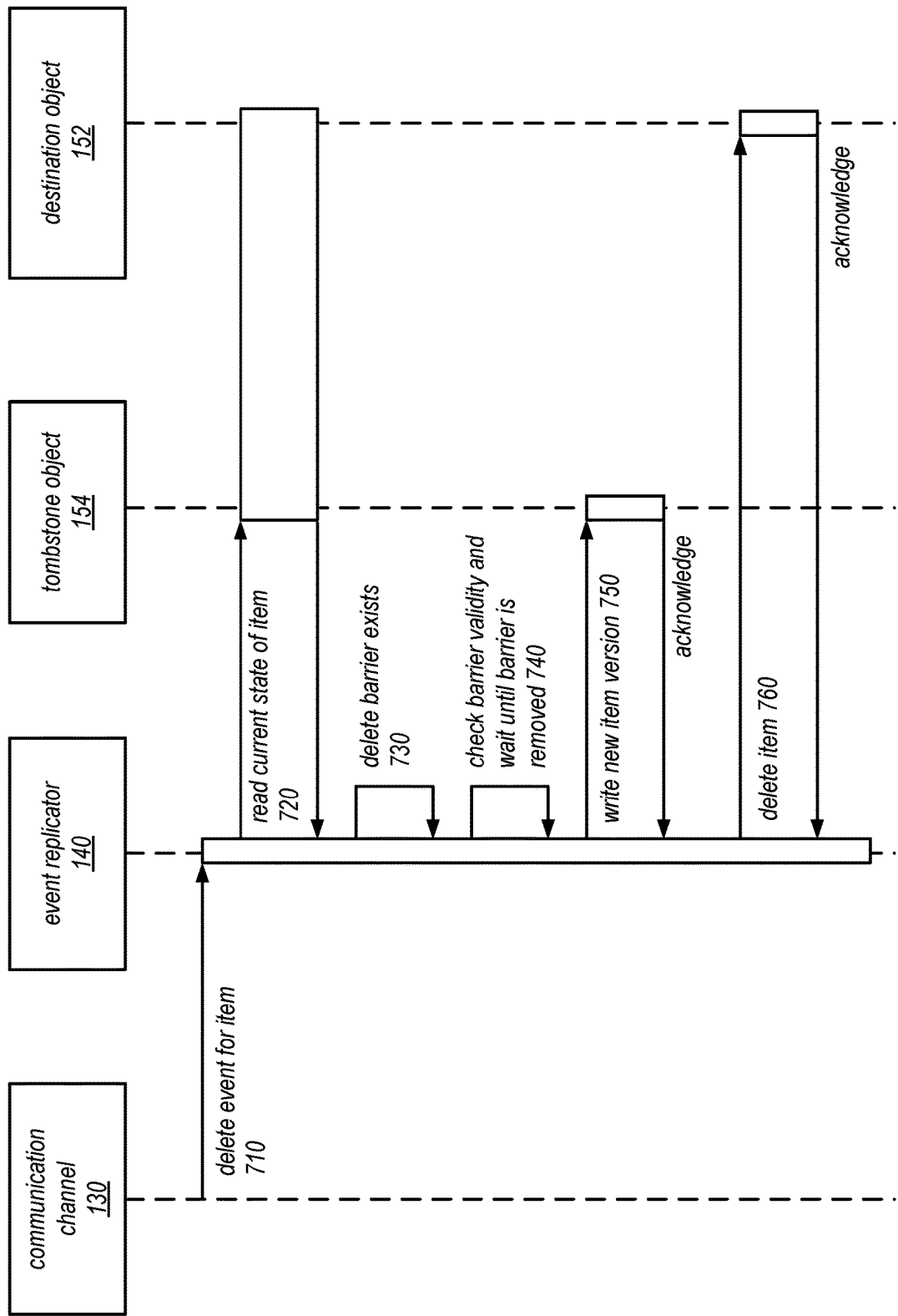
FIG. 7 is a system sequence diagram illustrating operations of an event replicator to apply an update event that deletes a data item, according to some embodiments.

FIG. 7 is a system sequence diagram illustrating operations of an event replicator to apply an update event that deletes a data item, according to some embodiments. As shown, the diagram depicts interactions between communication channel 130, event replicator 140, tombstone object 154, and destination object 152, as discussed previously.

At operation 710, the delete event for an item is received in similar fashion as discussed previously. At operation 720, the current state of the item in the destination data store is read, in similar fashion as discussed previously.

At operation 730, current state of the item is examined to determine that a delete barrier exists for the item. As discussed, the replicator nodes may erect delete barriers for certain types of update events in order to prevent other nodes from concurrently applying delete events to enforce correctness.

At operation 740, the event replicator 140 (or the particular replicator node) checks the delete barrier's validity. If the delete barrier is valid, the replicator node may wait until the delete barrier is removed before proceeding to apply the delete operation. However, if the delete barrier is determined to be invalid, the replicator node may remove the delete barrier on its own.

As discussed, under normal circumstances, only the creator or owner node that created the delete barrier should remove the barrier. However, in some embodiments, the creator or owner node may fail, or for other reasons become unable to remove the delete barrier. Thus, the deleting replicator node may remove the delete barrier as a garbage collection measure. In some embodiments, the check may entail checking a heartbeat table which records heartbeats from all replicator nodes. If it is determined that the creator or owner node failed to generate a recent heartbeat, in some embodiments, that failure may prompt the deleting node to remove the delete barrier. In some embodiments, the check may involve checking whether a process identifier associated with the barrier matches the current process identifier associated with the creator node. If not, this may indicate that the process that created the delete barrier has been restarted, and that the delete barrier has been orphaned. Again, in this situation, the deleting replicator node may remove the delete barrier. Depending on the embodiments, other checks may be performed to determine when a creator or owner node is no longer able to remove the barrier.

At operation 750, a new item version is written to the tombstone object. The new item version may indicate the delete event for the data item. This operation may be performed at the same as, or after, the delete barrier is removed in the tombstone object. At operation 760, the data item is deleted from the destination table.

The following table illustrates one example algorithm for applying item deletion events, which may be performed by a replicator node 420:

TABLE 3

GIVEN:
    ITEM: Data item to be replicated
    * On all conditional failures, the replicator node has to start from STEP 1.
STEPS:
1. Read the record corresponding to ITEM from TOMBSTONE and DESTINATION tables. If ITEM is newer, proceed.
2. If the record does not exist in either table:
   i. Conditionally write ITEM to TOMBSTONE and stop. Condition used: record does not exist.
3. If the record does not exist in DESTINATION but exists in TOMBSTONE:
   i. Check if a delete barrier exists. If so, check if the barrier is still valid. Stop and retry from STEP 1 with backoff if the barrier is valid.
   ii. Conditionally write ITEM to TOMBSTONE and stop. Condition used: TOMBSTONE item version has not changed.
4. If the record does not exist in TOMBSTONE but exists in DESTINATION:
   i. Conditionally write ITEM to TOMBSTONE. Condition used: record does not exist.
   ii. Conditionally delete ITEM from DESTINATION. Condition used: DESTINATION item version has not changed.
5. If the record exists in both TOMBSTONE and DESTINATION:
   i. Check if a delete barrier exists. If so, check if the barrier is still valid. Stop and retry from STEP 1 with backoff if the barrier is valid.
   ii. Conditionally write ITEM to TOMBSTONE. Condition used: TOMBSTONE item version has not changed.
   iii. Conditionally delete ITEM from DESTINATION and stop. Condition used: DESTINATION item version has not changed.

Note that in the above example, the checking of the clock values in the tombstone and destination objects may occur twice: the first time under step 1, and the second time when the tombstone or destination object is actually written. As shown, the second check may be performed via the conditional writer operation. In some embodiments, this second check is needed because an intervening write to the tombstone or destination object may have occurred between step 1 and the ultimate write operation, which causes the write operation to no longer be correct. Accordingly, the second check is performed so that if the target object is no longer in an expected state at the time of the write, the entire process aborts and restarts from the beginning.

Figure 8A:
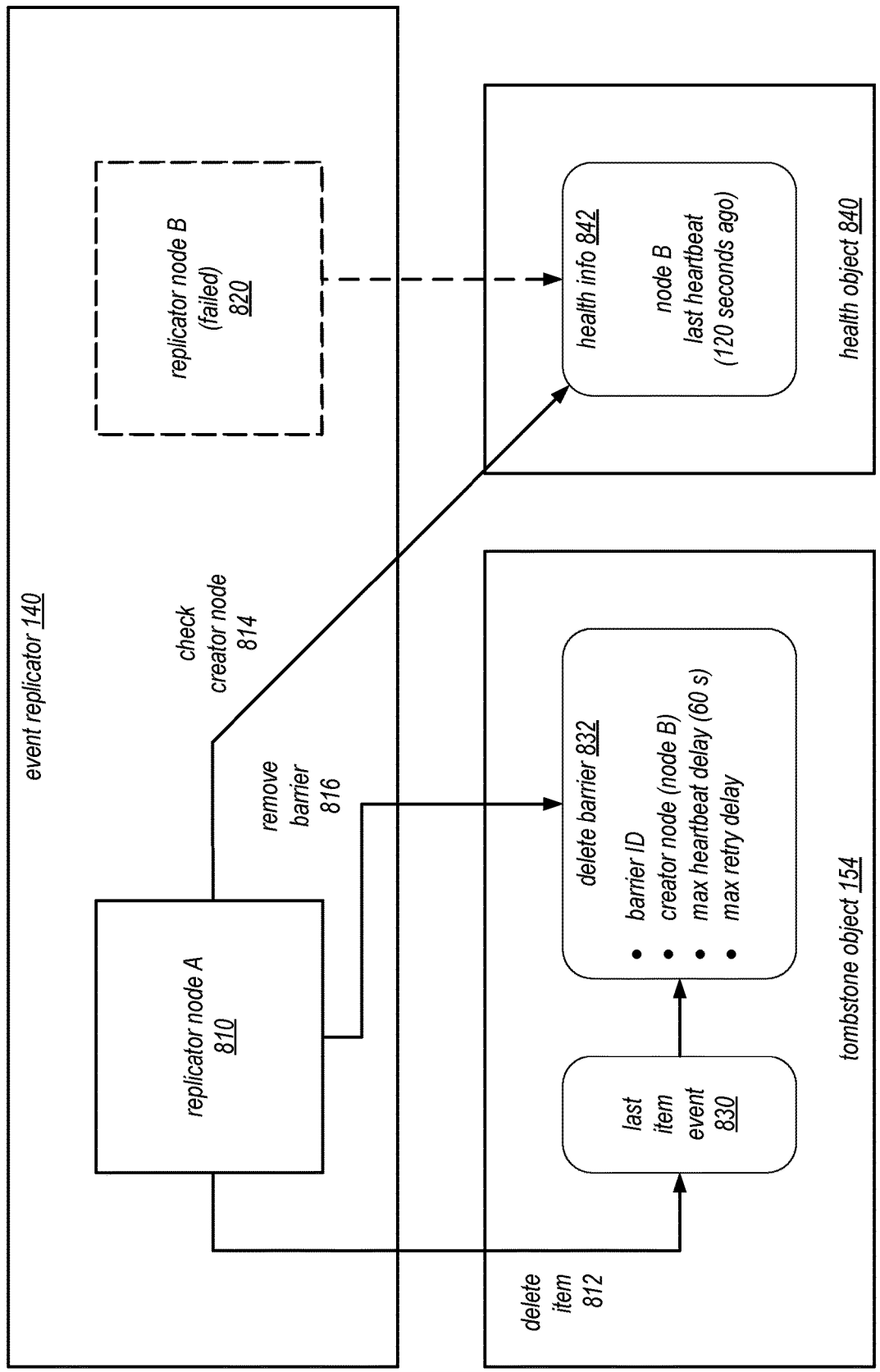
FIGS. 8A and 8B are diagrams illustrating the validation of delete barriers used by an event replicator in a data replication system, according to some embodiments.
Figure 8B:
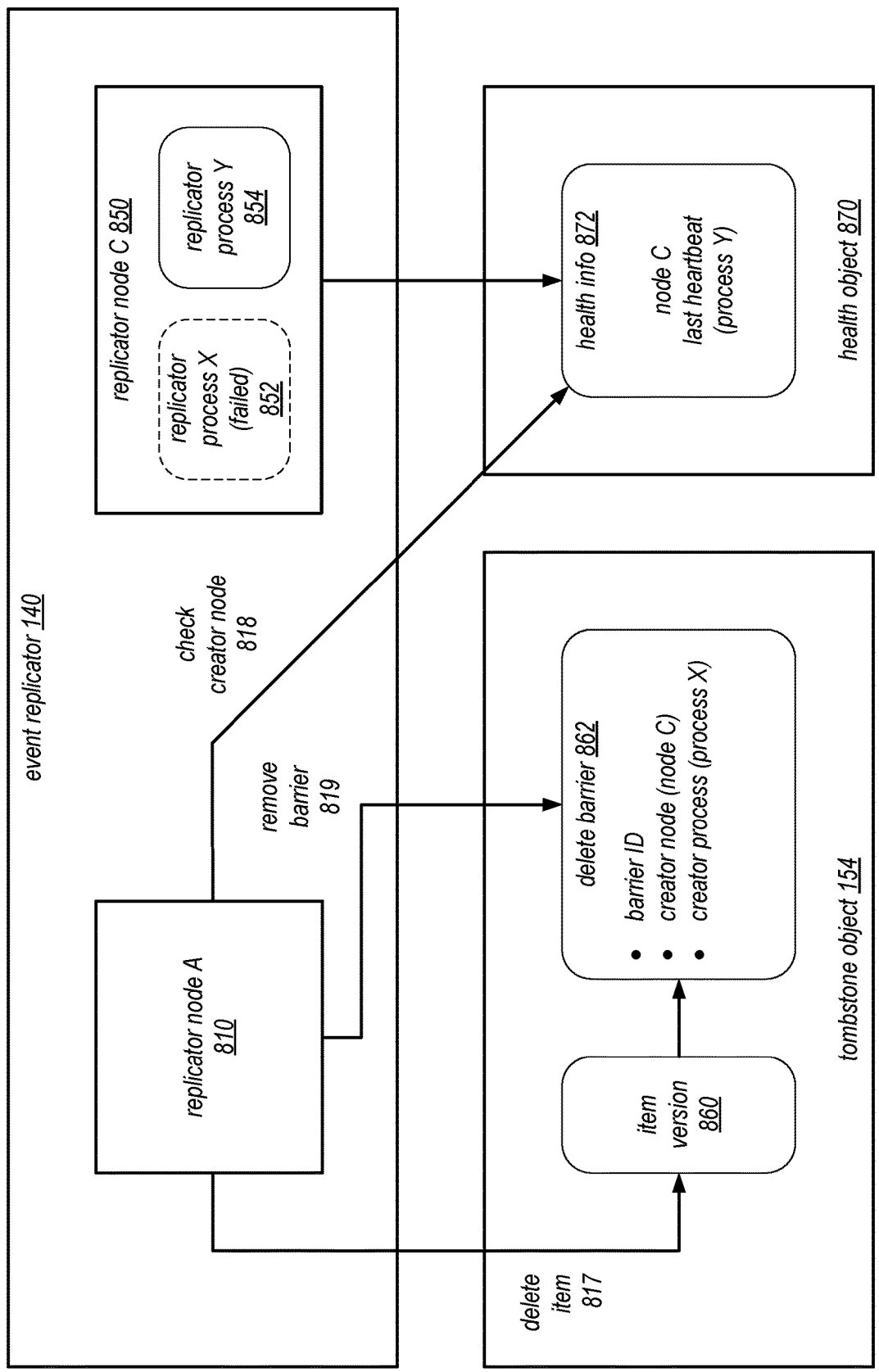

FIGS. 8A and 8B are diagrams illustrating the validation of delete barriers used by an event replicator in a data replication system, according to some embodiments.

FIG. 8A depicts an event replicator 140, which is implemented using multiple replicator nodes, including replicator nodes A 810 and B 820. As discussed, in some embodiments, these nodes may apply replication events independently and concurrently to the destination data store. In some embodiments, one node, for example node B, may create a delete barrier 832 in the tombstone object 154, as shown. As long as the delete barrier 832 is effect, all delete events to the data item covered by the barrier are blocked. However, as shown, in some embodiments, the creator node B of the delete barrier may become unable to remove the delete barrier. For example, node B may crash or become inoperable before the barrier 832 can be removed.

As shown, node A may later attempt to apply a delete event to delete 812 the data item. In some embodiments, it may look up the last item event 830 in the tombstone object for that item. In some embodiments, the delete barrier 832 for the item may be attached to the last item event 320. For example, the delete barrier 832 may be indicated via one or more metadata attributes of the event record in the tombstone object. Thus, in attempting to apply the delete event, node A will discover the delete barrier 832. As shown, the delete barrier 832 may contain various attributes, such as the barrier's ID, an indicator of the creator node (in this case node B), a max heartbeat delay that indicates the length of time that a node can generate no heartbeats before it is deemed dead, and a max retry delay that indicates a maximum amount of time before a deleting node (in this case node A) may try to apply the delete event again. In different embodiments, these barrier attributes may be different.

In some embodiments, once node A encounters the delete barrier 832, node A may perform a check to determine if the delete barrier is still valid. In some embodiments, the validity check may involve checking whether the creator node B is still alive or otherwise capable of removing the delete barrier 832. If not, node A may take it upon itself to remove the delete barrier.

In some embodiments, as shown, the validity check may be performed by consulting a health object 840 for the nodes. In some embodiments, the heartbeat object may be a data structure or table that collect heartbeats from the different replicator nodes. As shown the object contains health information 842, which in this example, indicates that node B's last heartbeat was generated 120 seconds ago. This length of time is longer than the maximum heartbeat delay in the delete barrier 832. Based on this, node A may determine that the creator node B is dead. Accordingly, node A will remove 816 the delete barrier, and proceed with applying its delete event.

FIG. 8B depicts another type of validity check for delete barriers. In this example, the replicator node C 850 hosts a replicator process (process X 852 or process Y 854) that updates the tombstone object 154 and creates delete barriers such as barrier 862. In some embodiments, each node may be a host or a virtual machine instance, and each process may be an ongoing process that actually updates the destination data store. In some embodiments, these processes may be Java virtual machine (JVM) processes. In some embodiments, each host or virtual machine node may have at most one replicator process, and if the replicator process fails, it is restarted with a new process ID. Thus, by comparing the process ID recorded in the delete barrier 862 when the barrier was created and the current process ID of the creator node stored in for example the health object 870, replicator node A may determine whether a replicator process has been restarted. If so, this may indicate that the delete barrier has been orphaned and can be deleted.

As shown, in this example, the delete barrier 862 indicates that it was created by node C via replicator process X. However, replicator process X has since failed, and the health information now indicates that node C is now running replicator process Y. When node A performs the validity check, it may determine that the process ID in the health information 872 does not match the process ID in the barrier metadata 862. Based on this, node A may conclude that the replicator process that created the delete barrier has been restarted, and that the delete barrier should be garbage collected 819.

The following table illustrates one example algorithm for performing a delete barrier validity check, which may be performed by a replicator node 420:

TABLE 4

GIVEN:
    BARRIER:    advertisement entry from the delete barrier metadata
    HEARTBEAT:    entry from heartbeat table
    max_hb_delay:    maximum amount of delay between two heartbeats
    max_retry_delay:    maximum amount of time before a writer is allowed to retry a delete event
ASSUMPTIONS:
    There is always a single JVM instance associated with a replicator node
STEPS:
    1. If HEARTBEAT and BARRIER have different jvm_instance_id and the heartbeat timestamp is more recent than barrier timestamp, then delete the barrier. Return invalid barrier.
    2. If HEARTBEAT is older than max_hb_delay, raise alarm for dead host of stuck JVM. Return valid barrier.
    3. If HEARTBEAT timestamp is newer than BARRIER timestamp by at least max_retry_delay then delete the barrier. Return invalid barrier.
    4. Return invalid barrier.

In the above example, step one ensures that if the JVM in which the writer was running is restarted, the barrier is removed without any manual intervention. Step two ensures that when no heartbeats are seen from the creator node, an alarm is raised. In some embodiments, when an alarm is raised, an operator will identify if the host or JVM is stuck. If so, the operator should restart the host or JVM. After the restart, the operator may override the barrier by deleting it. If the host was found dead, the operator may override the barrier by deleting it.

Figure 9:
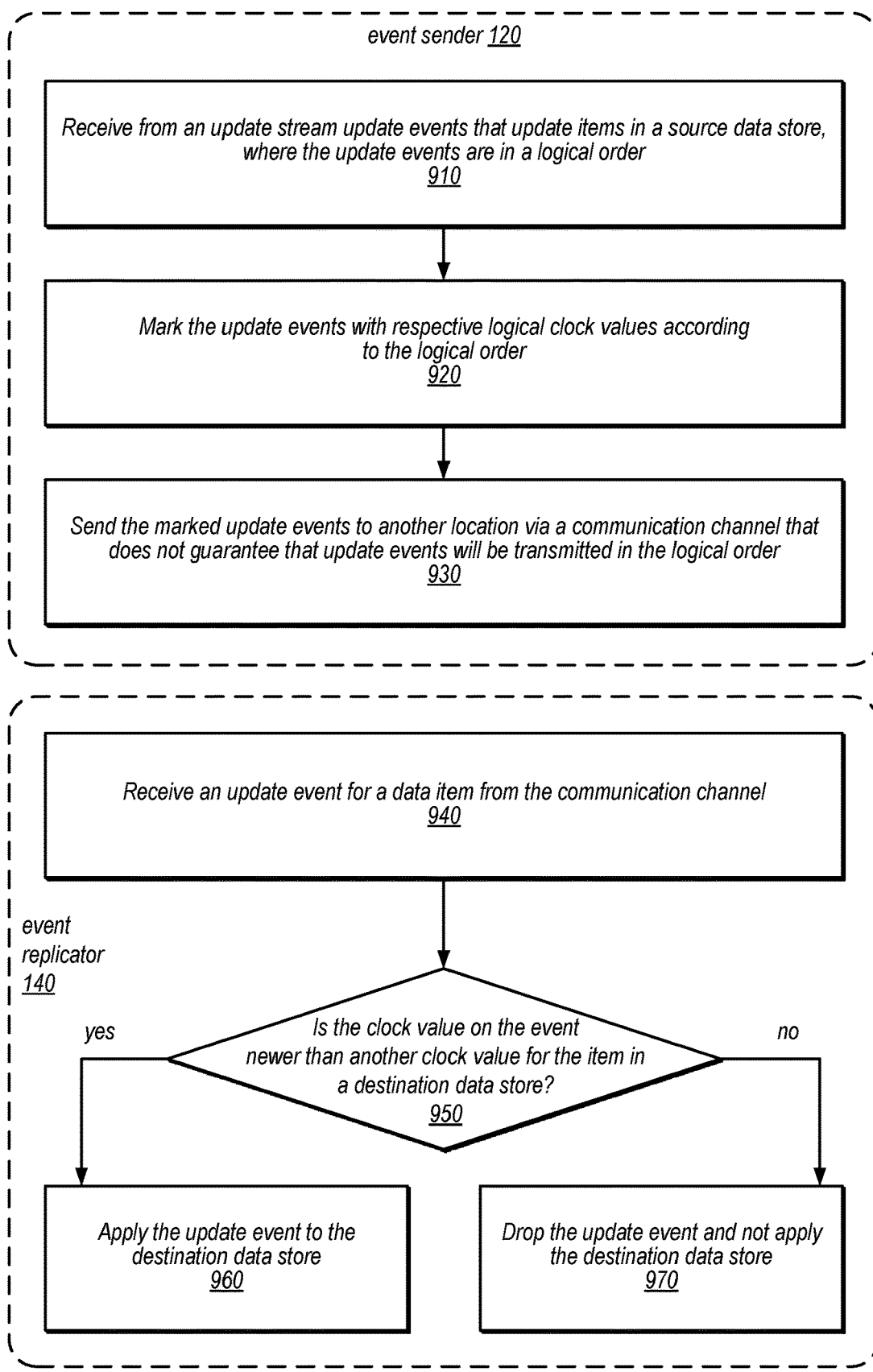
FIG. 9 is a flowchart illustrating the processing of update events by an event sender to an event replicator in a data replication system that transmits update events over a communication medium that does not guarantee the logical ordering of transmitted events, according to some embodiments.

FIG. 9 is a flowchart illustrating the processing of update events by an event sender to an event replicator in a data replication system that transmits update events over a communication medium that does not guarantee the logical ordering of transmitted events, according to some embodiments. As shown, operations 910, 920, and 930 may be performed by the event sender 110 as discussed previously, and operations 940, 950, 960, and 970 may be performed by the event replicator 140, as discussed previously.

At operation 910, update events are received from an update stream. The update events may update data items in a source data store. The update stream may order the update events in a logical order that the events were applied to the source data store. In some embodiments, the update stream may be generated by the source data store, and external listeners may register with a stream repository to receive events from the update stream.

At operation 920, the update events are marked with respective logical clock values according to the logical order. In some embodiments, the marking assigns an item version to each event, so that within a sequence of update events that modify a single data item, the events in the sequence are ordered according to the logical order. In some embodiments, the marking may be performed in using an item version object, which tracks the latest versions of each data item seen by the event sender. In some embodiments, each new update to a data item causes the version of that item to be incremented.

At operation 930, the marked update events are sent to another location via a communication channel. As discussed, in some embodiments the communication channel may not guarantee that the events will be transmitted in the logical order. For example, the communication channel may send the update events in different paths, or experience partial failures, so that the update events may arrive at their destination out of order. However, because each update event was marked with logical clock values in operation 930, the event replicator 140 may use the logical clock values to apply the received events correctly.

At operation 940, an update event is received by the event replicator 140 from the communication channel. In some embodiments, the event replicator may fetch batches of events from the communication channel. In some embodiments, the event replicator may periodically poll the communication channel to determine if new update events are available.

At operation 950, a determination is made whether a clock value on the event is newer than another clock value for the effected data item in the destination data store. In some embodiments, the destination data store may track the last logical clock values received for each data item. These last logical clock values may be compared against the clock values of newly arriving events. If the event is newer than the current version of the data item, the event is applied to the destination data store, as shown in operation 960. If the event is older than the current version of the data item, the event replicator may drop the stale event and not apply the event to the destination data store, as shown in operation 970.

Figure 10A:
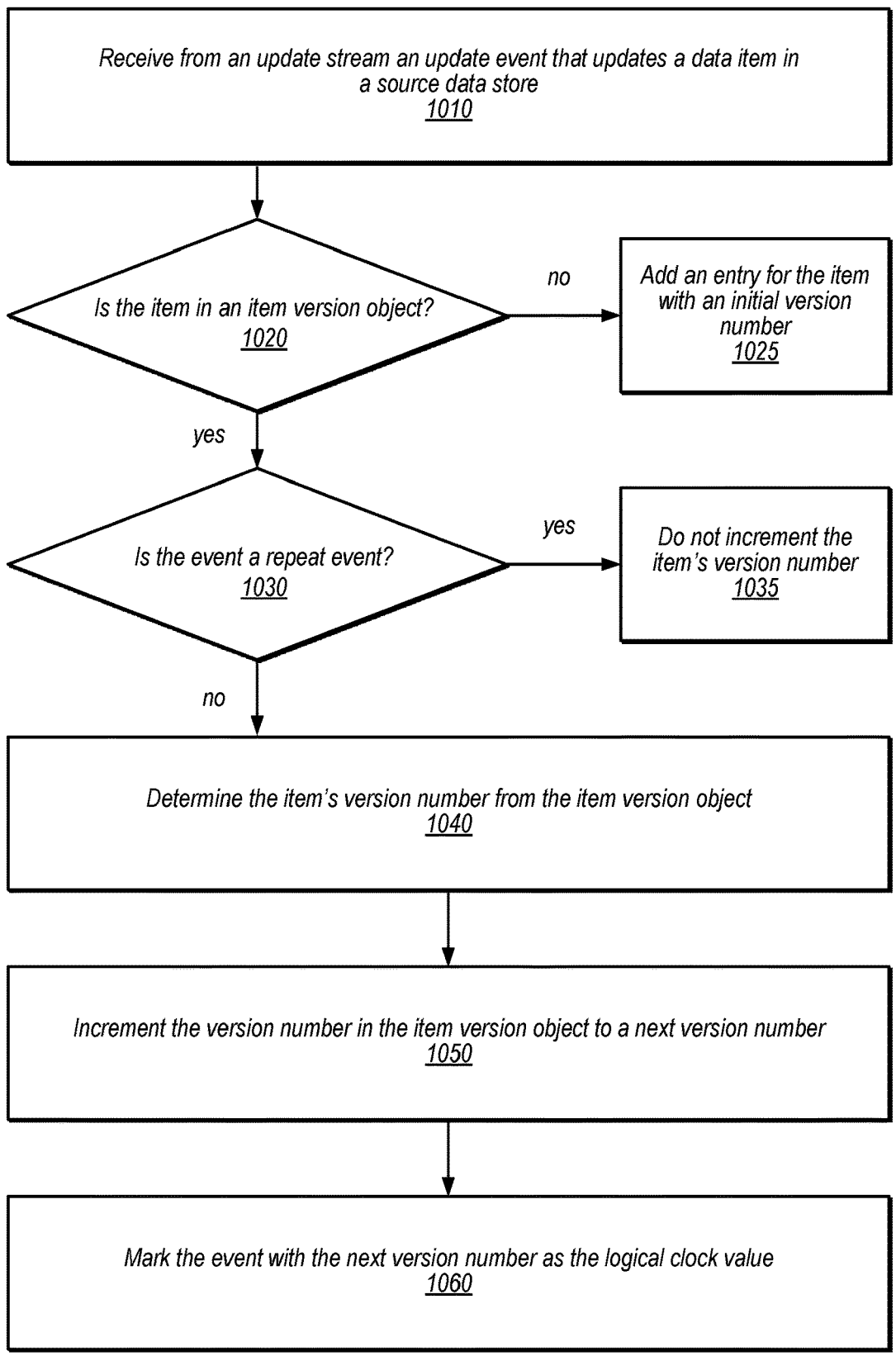
FIG. 10A is a flowchart illustrating a process of writing logical clock values on update events in a data replication system, according to some embodiments.

FIG. 10A is a flowchart illustrating a process of writing logical clock values on update events in a data replication system, according to some embodiments. In some embodiments, the depicted process may be performed by the event sender 120, the sender node 122, or the logical clock generator 124, as discussed previously.

At operation 1010, an update event is received from an update stream that updates a data item in a source data store. Operation 1010 may be performed in similar fashion as operation 910, as discussed previously.

At operation 1020, a determination is made whether the data item exists in an item version object. In some embodiments, the item version object may be item version object 230 as discussed previously. The item version object may be a table that implements a schema with the item key that identifies the data item, and a event ID that identifies the update event. In some embodiments, the item version object may be optimized for searching based on the item key and the event ID. For example, the item key may be used as a partition key that determines how data is partitioned for the item version object, and the event ID may be used as a sort key within each of the partitions. In some embodiments, operation 1020 may be performed by querying the item version object using the item key of the data item.

If the item does not exist in the item version object, the process proceeds to operation 1025, where an entry is added to the item version object for the item, including an initial version number for the item. This condition indicates that this is the first time that the event sender has seen an update to the item, and tracking is initiated for the item at version 1, for example. If the item does exist in the item version object at operation 1020, the process proceeds to operation 1030.

At operation 1030, a determination is made whether the update event is a repeat event. In some embodiments, this operation may be performed by querying the item version object for an entry with the same event ID. In some embodiments, repeat events may be generated by the source data store due to multiple sources, or retry attempts, etc.

If the event is a repeat event, the process proceeds to operation 1035, where the event sender does not increment the item's version number. In this case, the update event does not actually represent a new update to the item and does not generate a new item version. In some embodiments, the event sender may still send the repeat event via the communication channel but the repeat event is marked with the old version number. In some embodiments, the event sender may not send the repeat event at all. If the event is not a repeat event at operation 1030, the process proceeds to operation 1040.

At operation 1040, the item's version number is determined from the item version object. In some embodiments, the version number may simply be determined from the entry associated with the data item, which may have been obtained in operation 1020. In some embodiments, the item version object may store a logical clock value for each item, which monotonically increases with each distinct update event to the item. This logical clock value may be used as the item version, in some embodiments.

At operation 1050, the item's version number is incremented to a next version number. In some embodiments, the next version number may simply be the current version number plus one. Thus, the version number allows the event replicator at the destination location to determine the ordering of all update events to a single data item. In some embodiments, the next version number may be written to the item version object. In some embodiments, the next version number overwrites the current version number for the item in the item version object, so that only the last version numbers of the items are stored in the item version object. In some embodiments, operations 1040 and 1050 may be performed together in a single operation, so that no other thread or updater process can alter the item's versions number between the two operations. In some embodiments, operations 1040 and 1050 may be performed as a conditional update of the item version object, where the increment 1050 is only performed if the item's version number determined in operation 1040 remains unchanged.

At operation 1060, the update event is marked with the next version number as the logical clock value. For example, in some embodiments, the update event may have an attribute or field that allows the event sender to indicate the version number of logical clock value of the update event. In some embodiments, the marked update event is placed on the communication channel to be sent to the destination location.

Figure 10B:
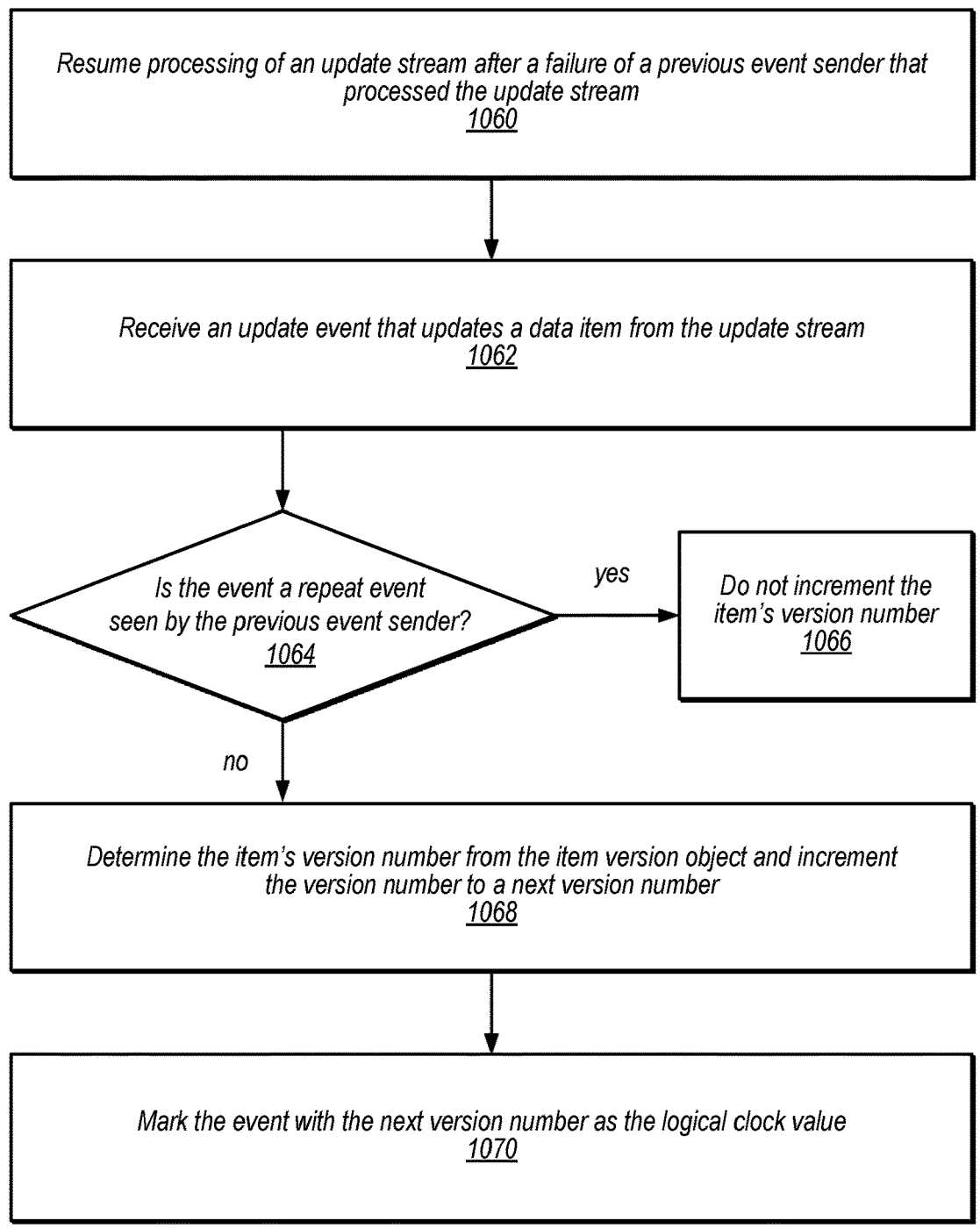
FIG. 10B is a flowchart illustrating a process of resuming an event sender after a failure in a data replication system, according to some embodiments.

FIG. 10B is a flowchart illustrating a process of resuming an event sender after a failure in a data replication system, according to some embodiments. In some embodiments, the depicted process may be performed by the event sender 120, the sender node 122, or the logical clock generator 124, as discussed previously.

At operation 1060, the event sender resumes processing of an update stream after a failure of a previous event sender that processed the same update stream. In some embodiments, event senders or sender nodes may fail or crash unexpectedly. However, because the item versions are tracked in a persistent item version object or table, a next instance of the event sender or sender node can pick up from where the last event sender left off, and seamlessly resume with the processing the update stream.

At operation 1062, an update event is received from the update stream. Operation 1062 may be performed in similar fashion to operation 1010 as discussed previously.

At operation 1064, a determination is made whether the event is a repeat event that was seen by the previous event sender. Operation 1064 may be performed in similar fashion as operation 1030 previously. As may be understood, because the previous event sender recorded the event ID of each event that it processed, repeated events can be easily identified. This feature is useful in situations where it is not clear where the previous event sender left off. In that case, the new event sender can simply reprocess the update stream from an earlier time, and any repeat events that have already been processed by the previous event sender will be correctly ignored.

Depending on the determination of operation 1064, the update event may not cause an increment of the item version number, as shown in operation 1066, or lead to an increment of the item version number as shown in operation 1068. At operation 1070, the update event is marked with next version number, in similar fashion as discussed for operation 1060.

Figure 10C:
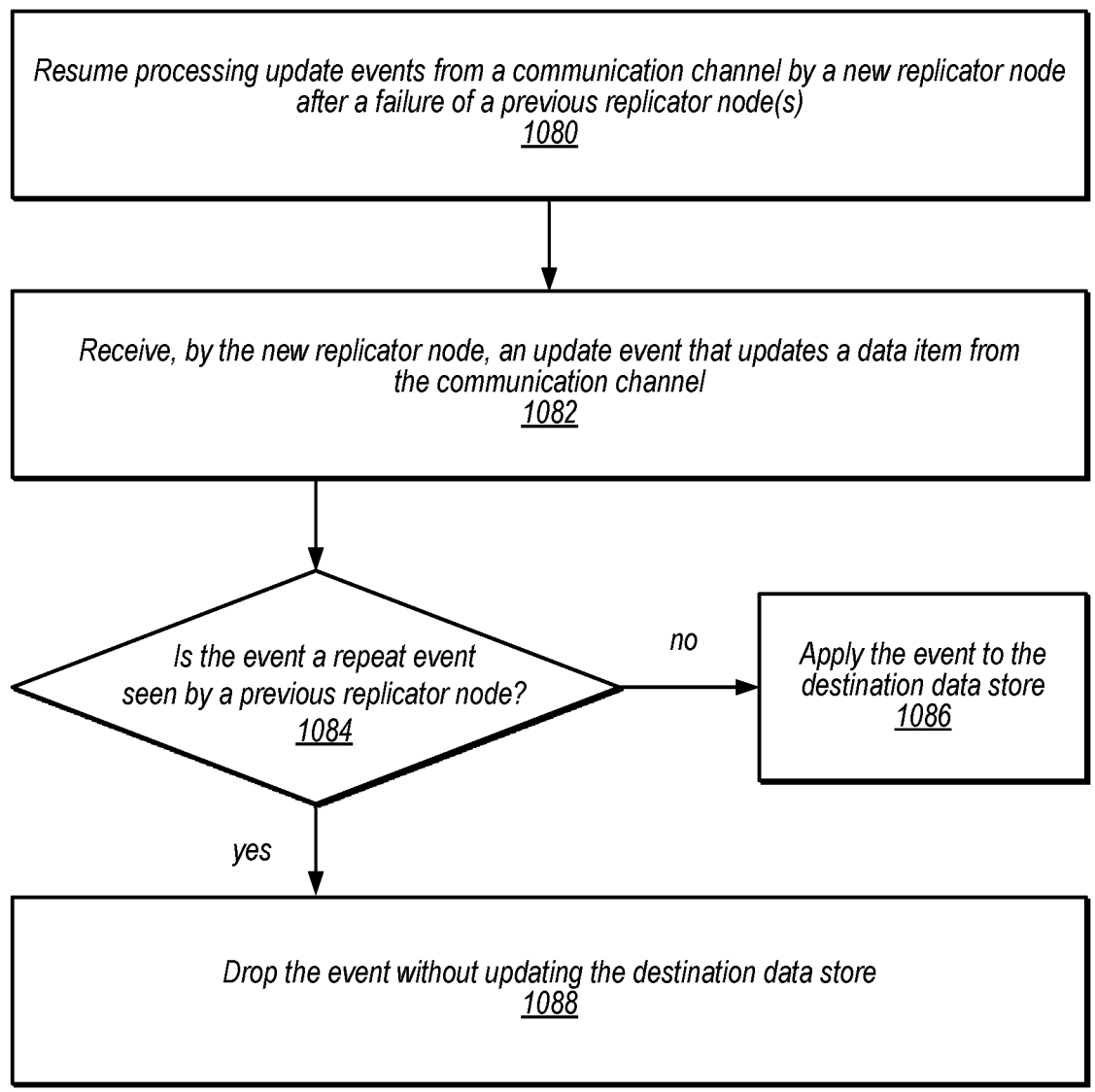
FIG. 10C is a flowchart illustrating of process of resuming an event replicator node after a failure in the data replication system, according to some embodiments.

FIG. 10C is a flowchart illustrating of process of resuming an event replicator node after a failure in the data replication system, according to some embodiments. In some embodiments, the depicted process may be performed by the event replicator 140, the replicator node 142, or the event applier 144, as discussed previously.

At operation 1080, processing of update events from a communication channel is resumed, after a failure of one or more previous replicator nodes. As discussed, in some embodiments, the event replicator may include a plurality of replicator nodes. In some embodiments, individual replicator nodes may stop, for example, due to unexpected errors or failures, or exit or reboot to perform routine maintenance. In some embodiments, new replicator nodes may be launched after previous replicator nodes have stopped.

At operation 1082, the new replicator node receives an update event that updates a data item from the communication channel. In some embodiments, operation 1082 may be performed in similar fashion as operation 1062.

At operation 1084, a determination is made whether the update event is a repeat event that has been seen by a previous replicator node. In some embodiments, a repeat event may be encountered because event replicator nodes may not immediately remove update events from the communication channel at the time they are fetched from the channel. In some embodiments, update events that have been fetched may be maintained on the communication channel, possibly in a temporarily invisible state, so that other replicator nodes do not fetch them. The fetched update events may be deleted only after they have been successfully processed by the replicator node, (e.g., successfully applied to the destination data store). In some embodiments, a replicator node may fetch a batch of update events, apply only a portion of the batch to the destination data store, and then fail in the middle of the batch. In this case, a new replicator node may fetch events that are repeat events of the previous replicator node. In some embodiments, a repeat event may be detected via an event identifier associated with the event, which may be stored in tombstone object. For example, the tombstone object may store not only the current state of the data item, but also metadata indicate the update event that produced the current state. If the incoming update event has an event ID that is the same as the event ID for that data item in the tombstone object, this may indicate that the incoming event is a repeat event, in some embodiments.

At operation 1086, if the update event is not a repeat event, the new replicator node may proceed to apply the update event. As discussed, the application may involve checking of the logical clocks of the incoming event with the logical clocks for the data item in the destination and tombstone objects, in some embodiments. In some embodiments, both objects are written in order to apply the update event.

If the update event is determined to be a repeat event, at operation 1088, the new replicator node drop the event without updating the destination data store. In some embodiments, neither the tombstone nor the destination object may be changed as a result of the incoming event.

As may be understood, this checking for repeat events allows the event replicator to easily recover from node failures, where it is unclear which update events in a batch a previous node has already applied. The depicted process automatically discards repeat events, so that each unique event is only applied once in the destination data store. Thus, repeat applications of large batches of update events following a node failure will not cause different results in the destination data store.

Figure 11:
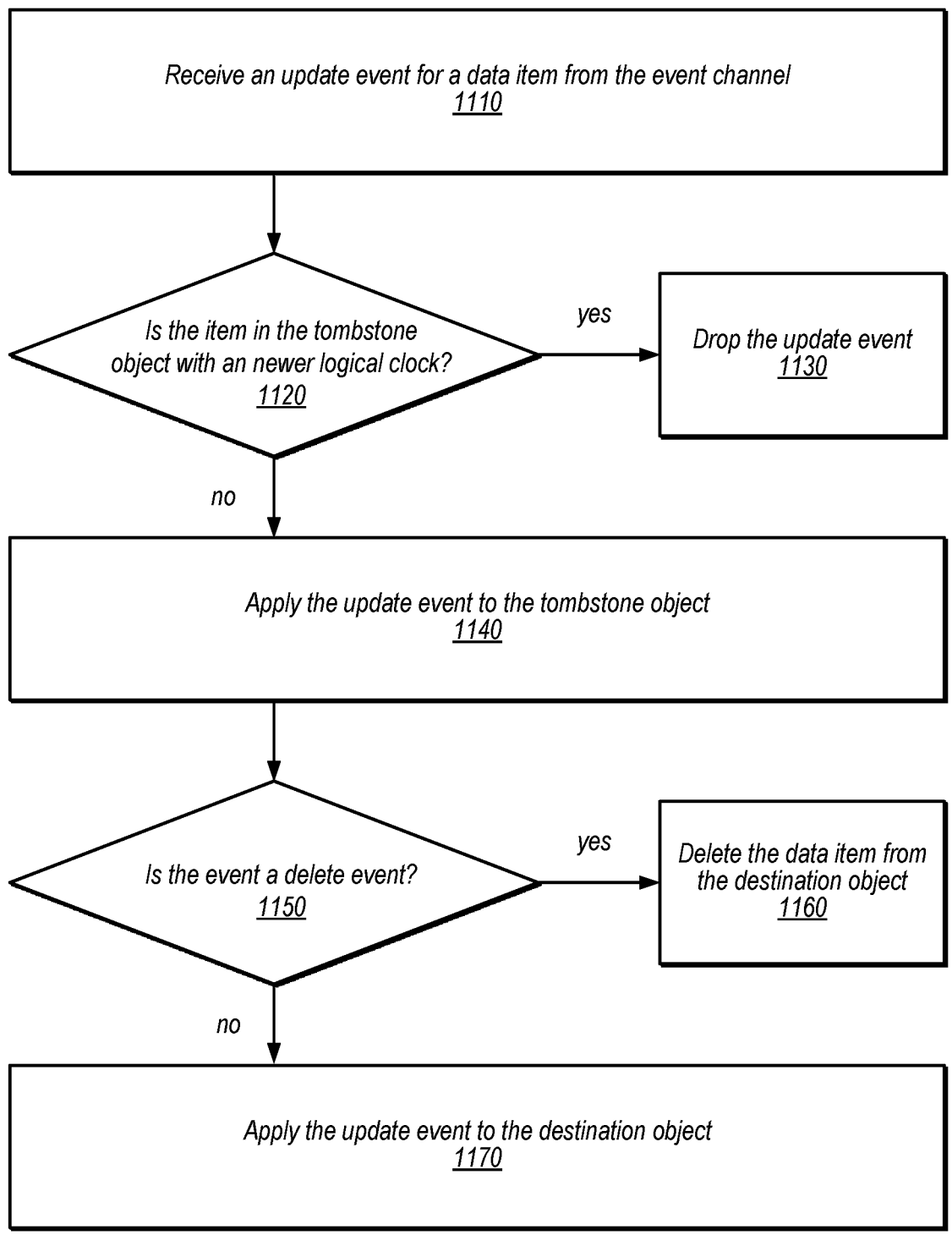
FIG. 11 is a flowchart illustrating a process of updating and using a tombstone object in a data replication system, according to some embodiments.

FIG. 11 is a flowchart illustrating a process of updating and using a tombstone object in a data replication system, according to some embodiments. In some embodiments, the depicted process may be performed by an event replicator 140 or replicator node 420, as discussed previously.

At operation 1110, at update event for a data item is received from the communication channel. In some embodiments, the update event is an event that is to be applied to the destination data store. In some embodiments, the event replicator may periodically poll the communication channel for new update events, and then retrieve any new update events in a batch. In some embodiments, the communication channel may deliver the update events out-of-order, but the event replicator may use the marked versions on the update events to applied the events in proper order.

At operation 1120, a determination is made whether the item exists in the tombstone object with a newer logical clock value. If this condition is true, the update event may represent a stale event that updates a data item that has already been deleted. If so, the process proceeds to operation 1130, where the event replicator drops the update event. In some embodiments, no modifications are made to the destination object of the tombstone object. If the condition is not true, the process proceeds to operation 1140.

At operation 1140, the tombstone object is updated to reflect the update event. In some embodiments, the tombstone object is a separate object from the destination object that stores the current state of the replicated data. In some embodiments, the tombstone object may be stored in a completely different data store. Unlike the destination object, the tombstone object contains data that indicates deleted items, so that their logical clock values or versions and maintained, in order to enforce the logical ordering of future events. In some embodiments, all types of update events (create, modify, or delete) will be written to the tombstone object, and not just the delete events. For example, in some embodiments, non-delete events that create delete barriers are also stored in the tombstone object.

At operation 1150, a determination is made whether the update event is a delete event. In some embodiments, the update event may include an attribute that indicates the type of event, for example, a create, modify, or delete event. This event type attribute may be used by the event replicator to determine how the event should be applied. If the event is a delete event, the process proceeds to operation 1160, where the data item is deleted from the destination object. However, a tombstoned version of the data item remains in the tombstone object.

At operation 1170, the event is applied to the destination object. At this point, the event replicator has determined that the update event is a non-delete event, and the subject data item has not been previously deleted. Accordingly, it may proceed with application of the event in the destination object. In some embodiments, another check may be performed to compare the logical clock values of the incoming data item and the existing data item in the destination object, as discussed previously. Thus, in some embodiments, the application of the event may include two logical clock value comparisons, once against the tombstone object, and another time against the destination object.

Figure 12:
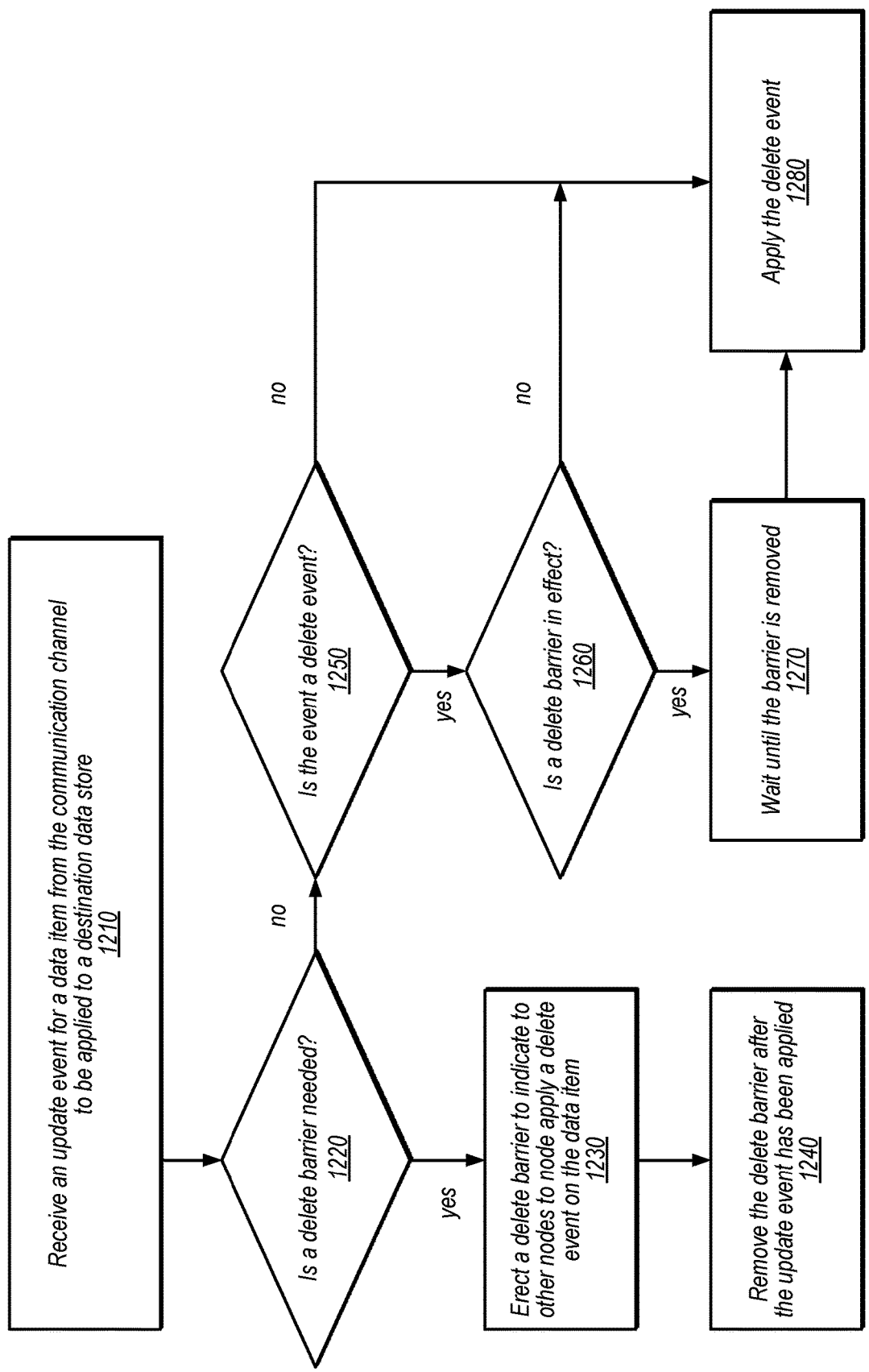
FIG. 12 is a flowchart illustrating a process of creating and using a delete barrier in a data replication system, according to some embodiments.

FIG. 12 is a flowchart illustrating a process of creating and using a delete barrier in a data replication system, according to some embodiments. In some embodiments, the depicted process may be performed by an event replicator 140 or replicator node 420, as discussed previously.

At operation 1210, an update event is received for a data item from the communication channel to be applied to a destination data store. Operation 1210 may be performed in similar fashion as discussed for operation 1110, as discussed previously. In some embodiments, before proceeding to the other operations, the process may first compare a logical clock in the update event with logical clocks in the destination data store, as discussed previously.

At operation 1220, a determination is made whether a delete barrier is needed for the update event. In some embodiments, this decision may be hardcoded in the replicator node. In some embodiments, only certain types of update events may erect delete barriers. For example, in some embodiments, only update events that create new items in the destination data store will employ the delete barrier. If a delete barrier is needed, the process proceeds to operation 1230.

At operation 1230, a delete barrier is erected to indicate to other replicator nodes that delete events should not be performed on the data item. In some embodiments, the creation of the delete barrier may involve updating the tombstone object to update the delete barrier metadata or attributes associated with the data item. In some embodiments, the delete barrier metadata may comprise a list of barriers, so that multiple nodes can create barriers on the same data item. In some embodiments, the creation of the delete barrier may occur at the same time that the update event is written to the tombstone object. For example, the updating of the item version in the tombstone object and the updating of the barrier metadata may be performed via a single write operation.

At operation 1240, the delete barrier is removed after the update event has been applied. In some embodiments, the update event may involve writes to multiple objects. With the delete barrier in place, other replicator nodes are prohibited from applying delete operations to the protected data item, which may cause consistency problems with the current update event. In the normal case, it is the responsibility of the replicator node that created the delete barrier to remove the delete barrier. Thus, in some embodiments, all exit branches of the event application process will remove delete barrier.

If a delete barrier is not needed, in some embodiments, the process proceeds to operation 1250, where a check is made if the event is a delete event. Operation 1250 may be performed in similar fashion as operation 1120, as discussed previously. If the event is a delete event, the process proceeds to operation 1260.

At operation 1260, a determination is made whether a delete barrier is in effect. The delete barrier may prohibit the delete event from being applied, for example, if the barrier is protecting a data item that is the subject of the delete event. In some embodiments, this determination may be made by checking the tombstone object. The last update event (and item version) for the item in question may be found. In some embodiments, that entry in the tombstone object will indicate whether any delete barriers are currently in place.

If a delete barrier is in effect, at operation 1270, the replicator node will wait until the delete barrier is removed, before proceeding to application of the event in operation 1280. Thus, the delete barrier prohibits delete events from being applied during certain critical times that may cause correctness issues during the replication process. In some embodiments, the replicator node may be register to be notified when the delete barrier is removed. In some embodiments, the replicator node may periodically poll the tombstone object to determine if the barrier is removed. In some embodiments, the replicator node may perform additional validity checks, and if the barrier is determined to be invalid, remove the barrier on its own.

Figure 13:
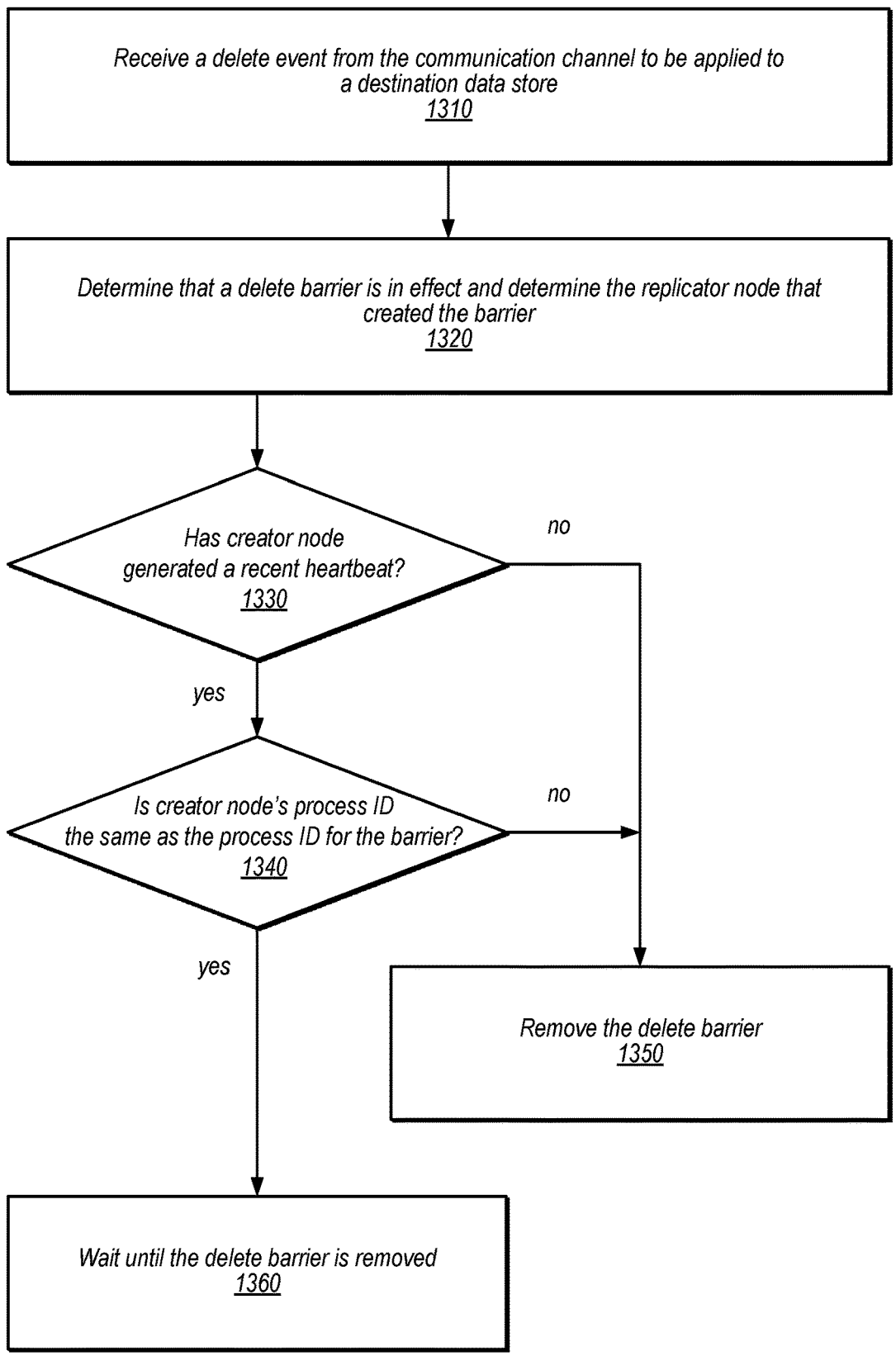
FIG. 13 is a flowchart illustrating a process of checking a delete barrier in a data replication system, according to some embodiments.

FIG. 13 is a flowchart illustrating a process of checking a delete barrier in a data replication system, according to some embodiments. In some embodiments, the depicted process may be performed by an event replicator 140 or replicator node 420, as discussed previously.

At operation 1310, a delete event is received from the communication channel to be applied to a destination data store. Operation 1310 may be performed in similar fashion as discussed for operation 1210, as discussed previously.

At operation 1320, a determination is made whether a delete barrier is in effect. This may be performed in similar fashion as discussed in connection with operation 1260, as discussed previously. Additionally, the operation also determines the replicator node that created the delete barrier. In some embodiments, the delete barrier metadata may indicate the creator node that created the barrier. For example, the barrier metadata may specify an identifier of a host or process that created the barrier. This information may be used to verify whether the creator node is alive, healthy, still using the delete barrier, or able to remove the delete barrier.

At operation 1330, a determination is made whether the creator node has generated a recent heartbeat. This operation may be performed by consulting a source of health information for the replicator nodes, for example, heartbeat data in a heartbeat object. In some embodiments, all replicator nodes will generate periodic heartbeats to the heartbeat object, so as to indicate their current status. If the creator node has not generated a recent heartbeat, this condition may indicate that the creator node has failed or is not functioning properly. This may mean that the creator node is no longer able to remove the delete barrier, and the process may proceed to operation 1350, where the node applying the delete operation will clean up the delete barrier. In some embodiments, the delete barrier metadata may specify a maximum heartbeat delay for the barrier, which indicates how long it takes before the creator node to be considered dead. In some embodiments, different creator nodes may provide different values for the maximum heartbeat delay, which may depend on the characteristics of the creator node or the reason for the barrier.

At operation 1340, a determination is made whether the creator node's current process ID is the same as the process ID attached to the barrier. In some embodiments, this may represent another test used to check whether the creator node is able to remove the delete barrier. In some embodiments, each creator node (e.g. a host or virtual machine instance) may correspond to one replicator process (e.g., a process such as a JVM process). Occasionally, the process may fail, and the host will start a new process in its place. Even though the new process can continue to generate heartbeats, it is no longer aware of the delete barrier left by its predecessor. Thus, in some embodiments, the delete barrier metadata may indicate the process ID of the process that created the barrier, and the heartbeat data may include the process ID of the process that is currently generating the heartbeats. If these two process IDs do not match, this may indicate a condition where the delete barrier should be removed, as shown in operation 1350.

If the replicator node cannot determine from operations 1330 and 1340 that the delete barrier is invalid, the process proceeds to operation 1360, where the replicator node will wait until the delete barrier is removed by the creator node. This operation may be performed in similar fashion, as discussed previously in connection with operation 1270.

Figure 14:
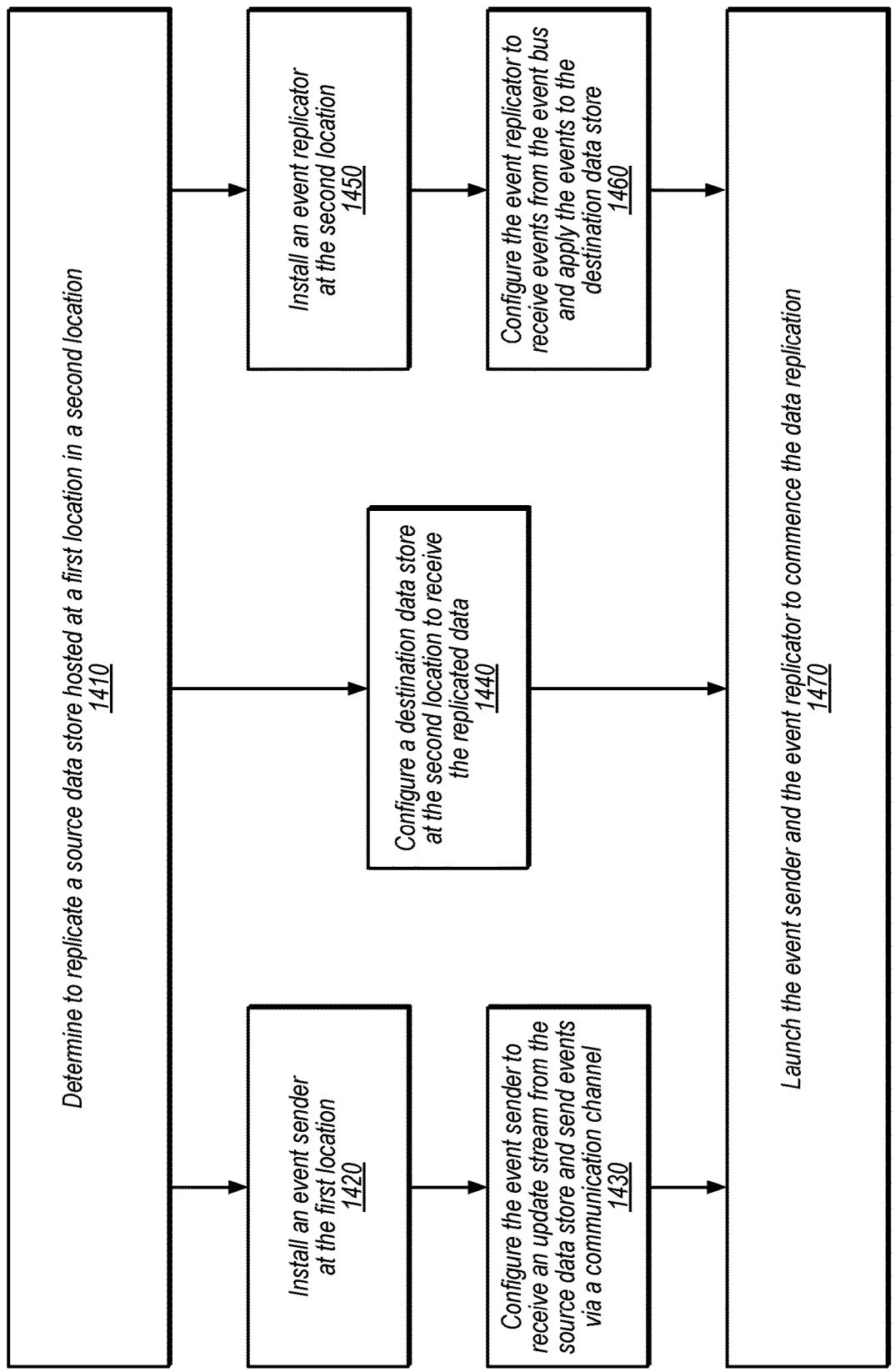
FIG. 14 is a flowchart illustrating a process of deploying a data replication system that transmits update events over a communication medium that does not guarantee the logical ordering of transmitted events, according to some embodiments.

FIG. 14 is a flowchart illustrating a process of deploying a data replication system that transmits update events over a communication medium that does not guarantee the logical ordering of transmitted events, according to some embodiments. As discussed, in some embodiments, the data replication system may not be part of the data storage system that is hosting the source data store. Rather, the data replication system may be built from external tools that are deployed separately and distinctly from the data storage system. The figure illustrates one process of such a deployment.

At operation 1410, a determination is made that a source data store hosted at a first location should be replicated in a second location. In this example, the source data store may be up and running, and configured to generate an update stream such as update stream 114. Thus, the data replication system may be built using external components based on the update stream.

At operation 1420, an event sender is installed at the first location. The event sender may be for example event sender 120 discussed previously. In some embodiments, the event sender may include event sender software modules or libraries. In some embodiments, the installation may include creating the item version object in a data store. The event sender may be able to run as an ongoing process that marks update events from the update stream with logical clock values so as to preserve their logical ordering. In some embodiments, the At operation 1430, the event sender is configured to receive the update stream from the source data store and send the events via the communication channel. In some embodiments, the event sender may be a reusable software module that is configurable to attach to different source data store instances. In some embodiments, event sender may be configured via a configuration file, which may indicate the source data store to register to and the communication channel to use.

At operation 1440, a destination data store is configured at the second location to receive the replicated data. In some embodiments, this operation may include creating the storage objects needed by the event replicator, such as the destination object and the tombstone object. In some embodiments, other administrative tasks may be performed to prepare the destination data store for replication. For example, in some embodiments, special data store partitions may be provisioned for the replication data objects. In some embodiments, the event replicator itself may perform the preparation of the destination data store programmatically.

At operation 1450, an event replicator is installed at the second location. The event sender may be for example event replicator 140 discussed previously. In some embodiments, the event replicator may include event replicator software modules or libraries. The event replicator may be able to run as an ongoing process (or multiple processes or multiple replicator nodes) to continuously apply received update events from the communication channel to the destination data store.

At operation 1460, the event replicator is configured to receive update events from the communication channel and apply the events to the destination data store. In some embodiments, the event replicator may be a reusable software module that is configurable to attach to different destination data store instances. In some embodiments, the destination data store may be of a different type from the source data store. In some embodiments, event replicator may be configured via a configuration file, which may indicate the destination data store to point to and the communication channel to monitor.

At operation 1470, when all of the components of the data replicator system have been installed and configured, the event sender and event replicator are launched to commence data replication. In some embodiments, this operation may include an initialization period, where the destination data store is fully populated with the current data from the source data store. In some embodiments, the initial population may be performed via a bulk data transfer. In some embodiments, the initial population may be performed via touch updates performed on the source data store. With the event sender running at the first location and the event replicator at the second location, all updates to the source data store will be reproduce in the correct order at the destination data store.

Figure 15:
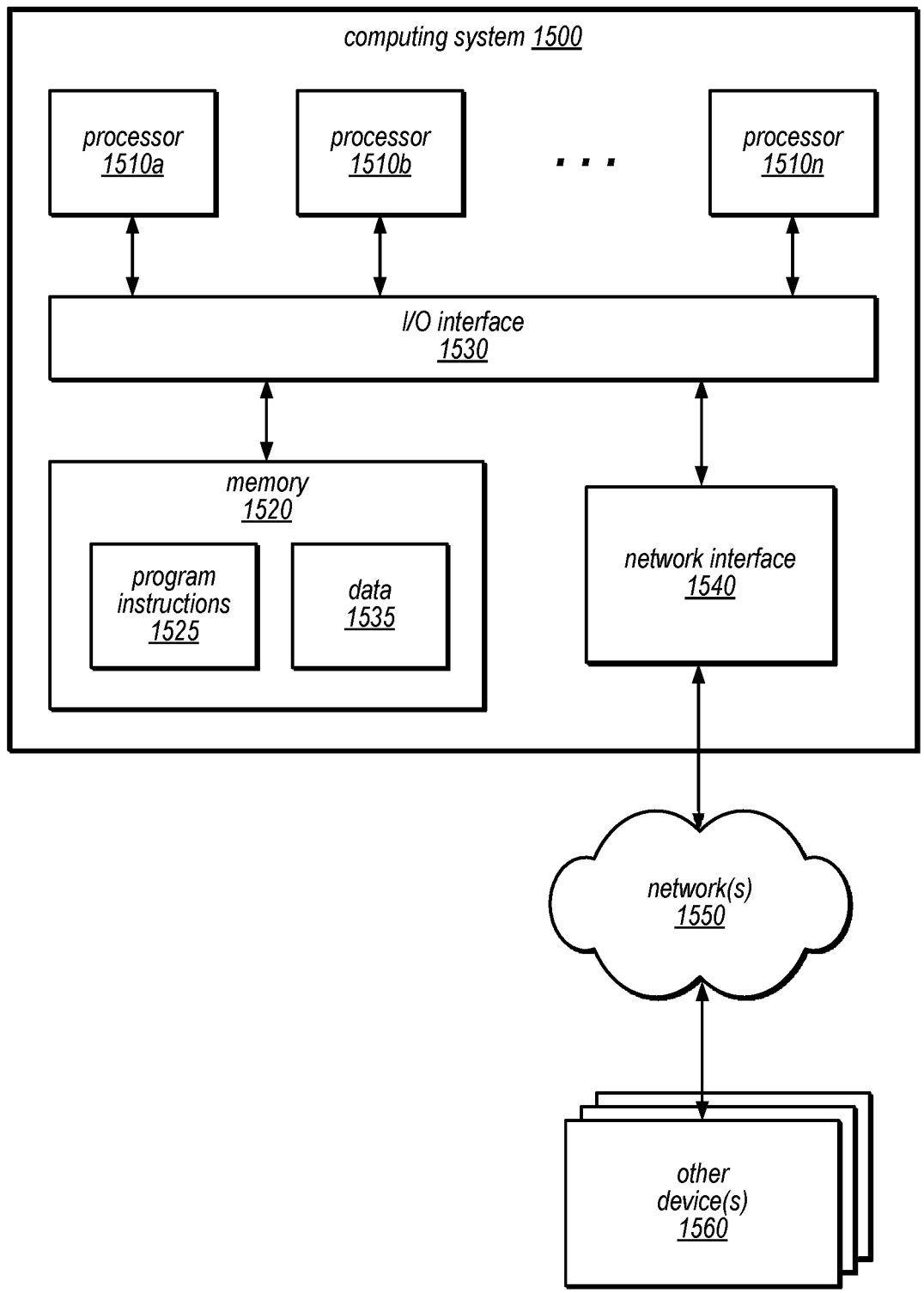
FIG. 15 is a block diagram illustrating an example computer system that can be used to implement one or more portions of a data replication system that transmits update events over a communication medium that does not guarantee the logical ordering of transmitted events, according to some embodiments.

FIG. 15 is a block diagram illustrating an example computer system that can be used to implement one or more portions of a data replication system that transmits update events over a communication medium that does not guarantee the logical ordering of transmitted events, according to some embodiments. For example, computer system 1500 may be used to implement portions of the event sender 110 or the event replicator 140, as discussed previously. Computer system 1500 may include or be configured to access one or more nonvolatile computer-accessible media. In the illustrated embodiment, computer system 1500 includes one or more processors 1510 coupled to a system memory 1520 via an input/output (I/O) interface 1530. Computer system 1500 further includes a network interface 1540 coupled to I/O interface 1530.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code 1525 and data 1535.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 920, may be incorporated directly into processor 1510.

Network interface 1540 may be configured to allow data to be exchanged between computer system 1500 and other devices 1560 attached to a network or networks 1550, such as other computer systems or devices, such as routers and other computing devices, as illustrated in FIGS. 1 through 13, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data as described above for FIGS. 1 through 13 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more computers at a first location implementing an event sender, configured with computer executable instructions to:
   receive a stream of update events from a source data store, wherein the update events are in an order;
   for individual update events:
   read from an item version object on persistent storage a logical clock value for a data item updated by the update event;
   update the item version object to increment the logical clock value to a next logical clock value; and
   send the update event with the next logical clock value over a communication channel that does not guarantee that the update events will be delivered in the order of the stream; and one or more computers at a second location implementing a plurality of replicator nodes executing concurrently and configured with computer executable instructions to apply the update events from the communication channel to a destination data store, individual ones of the replicator nodes configured to:
for a particular update event of a particular data item:
responsive to a determination that (a) the data item does not exist in a destination object and (b) a particular logical clock value of the update event is newer than another logical clock value of the data item in a tombstone object stored on persistent storage separate from the destination object:
update the tombstone object:
to indicate the particular logical clock value for the data item, and
to set a barrier attribute in the tombstone object that indicates to other ones of the replicator nodes to not perform delete events for the data item on the destination object;
add the data item to the destination object while the barrier attribute in the tombstone object is set; and
clear the barrier attribute in the tombstone object after the data item has been added to the destination object.

2. The system of claim 1, wherein individual ones of the replicator nodes are configured to:
for another update event of another data item:
determine that the other update event is a delete event and a barrier attribute for the other data item is set in the tombstone object by another one of the plurality of replicator nodes;
determine that the replicator node that set the barrier attribute is no longer using the barrier attribute based at least in part on health information pertaining to the replicator node that set the barrier attribute; and
clear the barrier attribute for the other data item in the tombstone object and delete the other data item from the destination object.

3. The system of claim 2, wherein the health information comprises a current process identifier for the replicator node that set the barrier attribute, and to determine that the replicator node is no longer using the barrier attribute, the replicator node of the delete event is configured to:
determine that a process identifier specified with the barrier attribute is different from the current process identifier for the replicator node that set the barrier attribute.

4. The system of claim 1, wherein individual ones of the replicator nodes are configured to write to the destination object via a conditional write operation so that a write is only performed when a specified precondition for the write is satisfied.

5. The system of claim 1, wherein the event sender is one of a plurality of event sender nodes implemented by the one or more computers at the first location, wherein the event sender nodes execute concurrently and update the item version object, and wherein individual ones of the event sender nodes are configured to write the item version object via a conditional write operation so that a write is only performed when a specified precondition for the write is satisfied.

6. The system of claim 1, wherein the event sender is configured to:
receive another update event from the stream for another data item;
determine from the item version object that the other update event is a repeat event of a previous update event for the other data item, and the previous update event is associated with a previous logical clock value; and
send the repeat event with the previous logical clock value over the communication channel without incrementing the previous logical clock value in the item version object.

7. The system of claim 1, wherein the first location is connected via the communication channel to a plurality of remote locations including the second location, and individual ones of the remote locations implement a respective set of replicator nodes that apply update events from the source data store to a respective destination data store at that remote location.

8. A method comprising:
performing, via a replicator node of a plurality of replicator nodes that concurrently execute to update a destination data store:
receiving, from a communication channel, an update event of a data item to be applied to a destination object;
responsive to a determination that (a) the data item does not exist in the destination object and (b) a logical clock value of the update event is newer than another logical clock value of the data item in a tombstone object stored on persistent storage separately from the destination object:
updating the tombstone object:
to indicate the logical clock value of the update event for the data item, and
to set a barrier attribute in the tombstone object that indicates to other ones of the replicator nodes to not perform delete events for the data item on the destination object;
adding the data item to the destination object while the barrier attribute in the tombstone object is set; and
clearing the barrier attribute in the tombstone object after the data item has been added to the destination object.

9. The method of claim 8, further comprising:
performing, via the replicator node:
receiving another update event of another data item from the communication channel;
determining that the other update event is a delete event and a barrier attribute for the other data item is set in the tombstone object by another one of the plurality of replicator nodes;
determining that the replicator node that set the barrier attribute is no longer using the barrier attribute based at least in part on health information pertaining to the replicator node that set the barrier attribute;
clearing the barrier attribute for the other data item in the tombstone object; and
deleting the other data item from the destination object.

10. The method of claim 8, wherein the health information comprises a current process identifier for the replicator node that set the barrier attribute, and determining that the replicator node is no longer using the barrier attribute comprises:
determining that a process identifier specified with the barrier attribute is different from the current process identifier for the replicator node that set the barrier attribute.

11. The method of claim 8, further comprising:
performing, via the replicator node:
- receiving a delete event of another data item from the communication channel;
- determining that the barrier attribute for the other data item is set in the tombstone object by another one of the plurality of replicator nodes;
- waiting until the barrier attribute is unset; and
- deleting the other data item from the destination object after the other barrier attribute is unset.

12. The method of claim 8, wherein the destination is written by the individual replicator nodes via a conditional write operation so that a write is only performed when a specified precondition for the write is satisfied.

13. The method of claim 8, further comprising:
performing, via the replicator node:
- receiving another update event of another data item from the communication channel;
- responsive to a determination that a logical clock value of the other update event is older than another logical clock value of the other data item in the tombstone object:
  - dropping the other update event so that it is not applied to the destination object.

14. The method of claim 8, further comprising:
performing, via the replicator node:
- receiving another update event of another data item from the communication channel;
- determining that the other update event is a delete event and no barrier attribute for the other data item is set in the tombstone object;
- updating the tombstone object to indicate the deletion of the other data item; and
- deleting the other data item from the destination object.

15. The method of claim 8, further comprising:
performing, via the replicator node:
- receiving another update event of another data item from the communication channel;
- responsive to a determination that a logical clock value of the other update event is newer than a first logical clock value of the other data item in the tombstone object and a second logical clock value of the other data item in the destination object:
  - updating the tombstone object and the destination object to indicate the logical clock value of the update event for the data item.

16. The method of claim 8, wherein the updating of the tombstone object and the adding of the data item to the destination object are performed in a manner resulting in a consistent update without employing transactional control mechanisms implemented by the destination data store.

17. The method of claim 8, wherein the update event is one of a plurality of update events generated from a source data store at a first location and the destination data store is at a second location, and further comprising:
- installing an event sender at the first location, wherein the event sender is distinct from the source data store;
- configuring the event sender to receive the update events from the source data store and send the update events via the communication channel;
- installing the replicator nodes at the second location; and
- configuring the replicator nodes to receive the update events from the communication channel.

18. The method of claim 8, further comprising:
subsequent to a failure of one or more of the plurality of replicator nodes, performing, via a new replicator node:
- receiving another update event of another data item from the communication channel;
- determining the other update event is a repeat event that has already been processed based at least in part on a comparison of the logical clock value of the other update event and a second logical clock value in the destination object or the tombstone object; and
- dropping the other update event without updating the destination object or the tombstone object responsive to the determination that the other update event is a repeat event.

19. A non-transitory computer-accessible storage medium storing program instructions that when executed on one or more processors implement a replicator node of a plurality of replicator nodes that concurrently execute to update a destination data store, the program instructions when executed cause the replicator node to:
- receive, from a communication channel, an update event of a data item to be applied to a destination object;
- responsive to a determination that (a) the data item does not exist in the destination object and (b) a logical clock value of the update event is newer than another logical clock value of the data item in a tombstone object stored on persistent storage separately from the destination object:
  - update the tombstone object:
    - to indicate the logical clock value of the update event for the data item, and
    - to set a barrier attribute in the tombstone object that indicates to other ones of the replicator nodes to not perform delete events for the data item on the destination object;
  - add the data item to the destination object while the barrier attribute in the tombstone object is set; and
  - clear the barrier attribute in the tombstone object after the data item has been added to the destination object.

20. The non-transitory computer-accessible storage medium of claim 19, wherein the program instructions when executed on the one or more processors cause the replicator node to:
- receive another update event of another data item from the communication channel;
- determine that the other update event is a delete event and a barrier attribute for the other data item is set in the tombstone object by another one of the plurality of replicator nodes;
- determine that the replicator node that set the barrier attribute is no longer using the barrier attribute based at least in part on health information pertaining to the replicator node that set the barrier attribute;
- clear the barrier attribute for the other data item in the tombstone object; and
- delete the other data item from the destination object.

21. The non-transitory computer-accessible storage medium of claim 19, wherein the program instructions when executed on the one or more processors cause the replicator node to:
- receive a delete event of another data item from the communication channel;
- determine that the barrier attribute for the other data item is set in the tombstone object by another one of the plurality of replicator nodes;
- wait until the barrier attribute is unset; and
- delete the other data item from the destination object after the other barrier attribute is unset.

22. The non-transitory computer-accessible storage medium of claim 19, wherein the program instructions when executed on the one or more processors cause the replicator node to:
- receive another update event of another data item from the communication channel;
- responsive to a determination that a logical clock value of the other update event is older than another logical clock value of the other data item in the tombstone object:
  - drop the other update event so that it is not applied to the destination object.

23. The non-transitory computer-accessible storage medium of claim 19, wherein the program instructions when executed on the one or more processors cause the replicator node to:
- receive another update event of another data item from the communication channel;
- determine that the other update event is a delete event and no barrier attribute for the other data item is set in the tombstone object;
- update the tombstone object to indicate the deletion of the other data item; and
- delete the other data item from the destination object.

24. The non-transitory computer-accessible storage medium of claim 19, wherein the program instructions when executed on the one or more processors cause the replicator node to:
- receive another update event of another data item from the communication channel;
- responsive to a determination that a logical clock value of the other update event is newer than a first logical clock value of the other data item in the tombstone object and a second logical clock value of the other data item in the destination object:
  - update the tombstone object and the destination object to indicate the logical clock value of the update event for the data item.

* * * * *